United States Patent
Watson

(10) Patent No.: US 7,526,957 B2
(45) Date of Patent: May 5, 2009

(54) VIBRATING INERTIAL RATE SENSOR UTILIZING SKEWED DRIVE OR SENSE ELEMENTS

(75) Inventor: William S. Watson, Eau Claire, WI (US)

(73) Assignee: Watson Industries, Inc., Eau Claire, WI (US)

( * ) Notice: Subject to any disclaimer, the term of this patent is extended or adjusted under 35 U.S.C. 154(b) by 61 days.

(21) Appl. No.: 11/640,823

(22) Filed: Dec. 18, 2006

(65) Prior Publication Data

US 2007/0240508 A1 Oct. 18, 2007

Related U.S. Application Data

(63) Continuation-in-part of application No. 11/379,169, filed on Apr. 18, 2006, now abandoned.

(60) Provisional application No. 60/826,046, filed on Sep. 18, 2006.

(51) Int. Cl.
*G01P 9/04* (2006.01)
*G01C 19/00* (2006.01)

(52) U.S. Cl. ................. 73/504.13; 73/504.16

(58) Field of Classification Search ............. 73/504.04, 73/504.12, 504.13, 504.14, 504.15, 504.16, 73/504.02, 1.37, 1.38
See application file for complete search history.

(56) References Cited

U.S. PATENT DOCUMENTS

| 4,157,041 A | 6/1979 | Loper, Jr. et al. |
| 4,655,081 A | 4/1987 | Burdess |
| 4,759,220 A | 7/1988 | Burdess et al. |
| 4,951,508 A | 8/1990 | Loper, Jr. et al. |
| 5,218,867 A | 6/1993 | Varnham et al. |
| 5,349,857 A | 9/1994 | Kasanami et al. |
| 5,430,342 A | 7/1995 | Watson |
| 5,445,007 A | 8/1995 | Varnham et al. |
| 5,471,875 A | 12/1995 | Sato et al. |
| 5,540,094 A | 7/1996 | Varnham et al. |
| 5,587,529 A | 12/1996 | Iguchi et al. |
| 5,621,171 A | 4/1997 | Fell |
| 5,635,640 A | 6/1997 | Geen |
| 5,763,780 A | 6/1998 | Matthews et al. |
| 5,817,940 A | 10/1998 | Kobayashi et al. |
| 5,932,802 A | 8/1999 | Ogawa |
| 6,272,925 B1 | 8/2001 | Watson |

(Continued)

OTHER PUBLICATIONS

Watson, William S., *Vibrating Element Angular Rate Sensors For Precision Applications*, pp. 17-20, Date unknown.

(Continued)

*Primary Examiner*—Helen C. Kwok
(74) *Attorney, Agent, or Firm*—Patterson, Thuente, Skaar & Christensen, PA

(57) ABSTRACT

A vibrating inertial rate sensor has sense elements that operate on axes that are rotationally skewed from a node reference axis, enabling both a rate sense and a drive sense determination. Alternatively, the skew may be applied to rotationally offset the drive elements from antinode reference axes to affect active torquing of the gyroscope. The skewed sensing scheme may be applied to vibratory systems having one or more node axes. The skewed drive scheme may be applied to vibratory systems having two or more node axes to affect active torquing.

14 Claims, 15 Drawing Sheets

U.S. PATENT DOCUMENTS

| | | |
|---|---|---|
| 6,550,329 B1 | 4/2003 | Watson |
| 6,651,499 B2 | 11/2003 | Fell et al. |
| 6,698,271 B1 | 3/2004 | Fell et al. |
| 6,805,007 B2 | 10/2004 | Fell et al. |
| 6,845,667 B1 | 1/2005 | Watson |
| 6,848,305 B2 | 2/2005 | Fell et al. |
| 6,883,374 B2 | 4/2005 | Fell et al. |
| 7,188,523 B2 * | 3/2007 | Wyse et al. .............. 73/504.12 |

OTHER PUBLICATIONS

Fell, C., Hopkin I., Townsend K., *A Second Generation Silicon Ring Gyroscope*, Symposium Gyro Technology, pp. 1.0-1.14, Dated 1999.

Lynch, D. D., *Coriolis Vibratory Gyros*, Symposium Gryo Technology, pp. 1.0-1.14, Dated 1998.

Watson, William S., *Vibrating Structure Gyro Performance Improvements*, Symposium Gyro Technology, pp. 6.0 to 6.13, Dated 2000.

Watson, William S., *Improved Vibratory Gyro Pick-Off and Drive Geometry*, Symposium Gyro Technology, pp. 5.0 to 5.14, Dated 2006.

International Search Report, dated Feb. 27, 2008, pp. 1-10.

* cited by examiner

VIBRATING INERTIAL RATE SENSOR UTILIZING SKEWED DRIVE OR SENSE ELEMENTS

RELATED APPLICATIONS

This application is a continuation-in-part of and claims priority to U.S. patent application Ser. No. 11/379,169, filed 18 Apr. 2006 now abandoned, which is hereby incorporated by reference herein in its entirety. This application further claims priority to U.S. Provisional Patent Application No. 60/826,046, filed 18 Sep. 2006, which is hereby incorporated by reference herein in its entirety.

TECHNICAL FIELD

The present disclosure relates generally to angular rate sensors, and more particularly to vibrating element angular rate sensors used, for example, as gyroscopes.

BACKGROUND OF THE DISCLOSURE

Instrumentation sensors that operate on a principle of vibration of constrained actuator masses are known in the art. Angular rate gyroscopes make use of the principle of inertia to measure the rate of rotation through an angle with respect to a sensing axis. One type of angular rate gyroscope is the solid-state gyroscope. Vibrating rate gyroscopes utilize standing waves that are excited in a resonating element to produce a desired mode of oscillation having a predetermined number of nodes at predetermined node spaces. The oscillations have an inherent oscillatory inertia that is insensitive to the translation motion of the gyroscope itself, as well as to rotational movement that is orthogonal to a sensing axis. To the extent the resonating element is rotated about the sensing axis, the oscillations will essentially maintain their inertial orientation (i.e. the predetermined number of nodes and node spacing). The rotation of the nodes that define the desired mode of oscillation may lag the actual rotation of the physical structure of the resonating element about the sensing axis. The lag is characterized by a "precession constant" that is the ratio of the rotation of the oscillation pattern to the rotation of the resonating element. Accordingly, it is possible to determine the rate of rotation of the resonating element, in addition to the magnitude and direction of rotation by measuring the rotational displacement of the nodes on the resonating element.

Solid-state gyroscopes based on the principle described above are capable of sensing only rotation and then usually only about a single axis. To obtain information sufficient to determine the relative attitude of a body, it is necessary to group three such gyroscopes in an orthogonal relationship covering the x, y, and z Cartesian axes. The inherent challenge in using vibrating rate sensors, particularly multiple vibrating rate sensors, is trying to reduce or cancel out any differences or noise at the nodes so that the accuracy and reliability of the solid-state gyroscope can be optimized.

The conventional wisdom is that to minimize the inherent challenges presented by vibrating rate sensors a gyroscope should have maximum geometrical symmetry among the rate sensors, be made of materials having a high mechanical "Q" (defined as ratio of the magnitude of the total energy of a vibrating system to the magnitude of the energy added to the system during each oscillatory cycle), and feature isolation of the drive and rate sensing functions. See, e.g., W. S. Watson, *Vibrating Element Angular Rate Sensor For Precision Applications*, IEEE Position Location and Navigation Symposium, 1990; D. D. Lynch, Coriolis Vibratory Gyros, Symposium Gyro Technology, Stuttgart Germany, September 1998; and C. Fell, I. Hopkin, K. Townsend, A Second Generation Silicon Ring Gyroscope, Symposium Gyro Technology, Stuttgart Germany, September 1999. Unfortunately, these aspirations must be regularly compromised in the real world in order to reduce cost and complexity of the gyros.

For example, one type of angular rate sensor utilizes a cup or bell shaped sensor that is supported upon a stem and secured to the chassis of the sensor. The surface of the cup comprises drive electrodes and sense electrodes that are alternately oriented symmetrically around the perimeter surface. Exciting the drive electrodes induces a controlled oscillation upon the cup. The sense electrodes produce a signal that is demodulated in control circuitry to determine the angular rate at which the sensor is rotated. A number of techniques are known in the art that attempt to correct for errors in the desired mode of oscillation due to inherent errors and imperfections in the gyroscope assembly.

U.S. Pat. No. 5,471,875 to Sato et al. teaches the use of a first pair and a second pair of radially opposed driving electrodes provided on the outer surface of a resonator located at a pre-determined antinode axes of a cylindrical shaped resonator, and means for generating concurrently a first force and a second force at each of the first driving electrodes and each of the second driving electrodes, respectively, so that the first force reverses its direction along the radius of the resonator at a regular interval, the second force reverses its direction along the radius of the resonator at a regular interval, and the direction of the first force is opposite the direction of the second force. The complimentary action of the first and second forces prevents or limits offset of the nodes thereby restricting the null voltage signal at the sensors, which are located at the oscillation nodes. Accordingly, the drive and the sense electrodes are distributed at equal angular spacing about the centerline of the cylindrical resonator and are coincident with the antinodal and nodal axes, respectively.

U.S. Pat. No. 5,218,867 to Varnham et al. and U.S. Pat. No. 6,805,007 to Fell, et al. disclose what is herein referred to as a "mixed pair" of elements, i.e. drive elements diametrically opposed to sense elements about axisymmetric vibratory elements. At least two such mixed pairs are utilized, with a rotational displacement of 45° therebetween. The 45° displacement coincides with the spacing between adjacent nodal and antinodal axes of the disclosed oscillatory patterns. The angular arrangement about the centerline enables the drive elements to control the oscillation pattern and optimizes sensing of the position of the oscillation pattern in response to a rotational rate.

U.S. Pat. No. 5,445,007 to Varnham et al. discloses a correction technique that entails splitting the connections for one of the drive electrodes and driving the split electrode with a pair of drive voltages that are then typically detected by a corresponding pair of drive sensors for purposes of making adjustments to attempt to correct any errors in the desired mode of oscillation. This technique suffers from a number of shortcomings. In order to maintain symmetry of the oscillation, the mass and size of all of the elements are matched as closely as possible, but the asymmetry introduced by splitting one drive electrode adversely affects the overall uniformity and ability to maintain the desired oscillation mode. Additionally, the split drive electrode requires two conductor connections instead of the single conductor utilized on the other elements. The additional mass of the second connection introduces further asymmetry that is deleterious to resonance performance. In addition, the split drive plate is used only for static alignment, and is not used to augment active torque adjustment.

Compensation techniques exist to counter these shortcomings, such as corrective signals from other sensors such as thermistors, the use of EEPROM correction tables, or restricting use to a reduced temperature range. However, these measures tend to add complexity and cost to the design and require extra testing and adjustment. Even if cost and complexity were not issues, these measures are of limited effectiveness as they attempt to correct the problem after the fact, rather than addressing the underlying challenge.

Another known type of angular rate sensor comprises the use of piezoelectric ceramic bender elements in a paired tuning fork arrangement. In this type of arrangement, a pair of drive elements is energized to induce a controlled vibration within a single plane. The application of rotational forces upon the vibrating elements parallel to the plane of vibration and on the axis of symmetry induces a measurable signal characteristic of the angular relationship between the sensing object and the vibrating elements. Inherent to tuning fork designs are the bending forces that result from the oscillating drive elements. Although some designs attempt to reduce such undesirable forces by isolating the drive and sense elements, there are still errors that lead to reduced signal-to-noise ratios and false indication of rotation.

While numerous vibration based angular rate sense systems exist, none provide a simple and economical design with the ability to both adjust the angular relationship between the drive and sense elements and maintain symmetrical mass structures for maintaining desired oscillatory modes.

SUMMARY OF THE DISCLOSURE

In accordance with various embodiments of the present invention, a vibrating inertial rate sensor that has either drive or sense elements that are rotationally offset or "skewed" from their typical orthogonal or rotationally symmetric relationship. In one embodiment, a plurality of reference axes are defined by the nodes and antinodes of an oscillatory pattern on an axisymmetric vibrating structure. The members of a first pair of drive or sense elements reside on opposite sides of the structure and are offset or "skewed" in one rotational direction relative to a first reference axis. A second pair of drive or sense elements is equally offset or "skewed" in the opposing rotational direction relative to a second reference axis. When the skewed element pairs are sense elements, the gain ratio of the signals from the two pairs may be adjusted to determine the effective sensing vector without the need for additional conductor connections. When the skewed element pairs are drive elements, the gain ratio of the excitation voltages may be adjusted to redirect or "torque" the oscillatory node position, again without resort to additional conductor connections. Certain principles of the present invention may be applicable to a variety of vibrating structure gyroscope or vibrating inertial rate sensor forms, including, but not limited to, cup-type or bell-type vibrating structures, ring-type vibrating structures, fork-type vibrating structures and plate-type vibrating structures.

In another embodiment, an inertial sensor apparatus for use in producing an angular rotation signal indicative of a rate of angular rotation of the inertial sensor apparatus comprises a vibratory resonator structure, such as a cup, plate, or ring, having a first node reference axis associated with a desired mode of oscillation. A first sense element in the form of a pair of electrodes is located substantially on the vibratory resonator structure, the sense elements being in diametric opposition to one another to define a first sense axis that is rotationally offset or "skewed" from the first node reference axis. The first pair of sense electrodes are configured and arranged to generate a first signal in response to rotation of the inertial sensor apparatus. In the application of this embodiment to a gyroscope, the vibratory resonator structure is configured and arranged to vibrate in response to an excitation voltage.

Advantages of some of the skewed sense embodiments include an optimized rate sense signal, an optimized drive sense signal, produced by fewer electrode connections for simplicity and greater symmetry for better resonance performance. Also, the gains of both signals may track exactly and the open loop gain may be constant within the limits of the AGC system because the same electrodes are used for sensing both the rotation rate and the drive amplitude. In addition, the availability of additional sense electrodes provides a larger signal-to-noise ratio.

In another embodiment, a drive element in the form of a pair of drive electrodes may be located substantially opposite one another and offset from the sense electrodes of the vibratory resonator structure. The drive electrodes serve to control excitation and subsequent oscillation vector of the vibratory resonator structure. An advantage of the skewed drive electrode configuration is the facilitation of active torquing adjustments through the drive elements without resort to utilizing dedicated elements. The skewed arrangement of the drive elements enables adjustment of the driven oscillation vector. The ratio of the drive voltages for each drive axis is adjusted to affect the position of the drive vector between the two skew angles. This can be used for static alignment or for torquing the drive vector.

In the skewed drive embodiment, the resonator structure may also define a second node reference axis associated with the desired mode of oscillation, which is substantially orthogonal to the first node reference axis. Because there is no need for a dedicated pair of electrodes to perform the torquing function, a second sense element in the form of a second pair of sense electrodes may be positioned in their stead. The second pair of sense electrodes are located substantially opposite one another to define a second sense axis that is also rotationally offset or skewed from the second node reference axis. The skew allows a small controlled amount of drive motion to be collected on the electrode along with the rate sense signal. This second pair of sense electrodes generates a second signal of opposite polarity in response to rotation of the inertial sensor apparatus and of the same polarity in response to drive motion. By subtracting the signals from the first and second sense electrodes, one can determine an angular rate sense signal. Addition of the first and second sense electrode signals provides indicia of the drive sense signal.

Another advantage of some embodiments of the present invention is that symmetry of component placement in relation to the major axes of the vibration pattern may be partially maintained. While the skew angles preclude uniform angular spacing about the central axis of an axisymmetric body, the components are still in mirrored symmetry about the node reference axes or the antinode reference axes, depending on the implementation. The partial symmetry promotes the uniform propagation of the oscillatory pattern.

Additional advantages and features are set forth in part in the description which follows, and in part, will become apparent to those skilled in the art upon examination of the following or may be learned by practice of the embodiments described herein.

DETAILED DESCRIPTION

Figure 1:
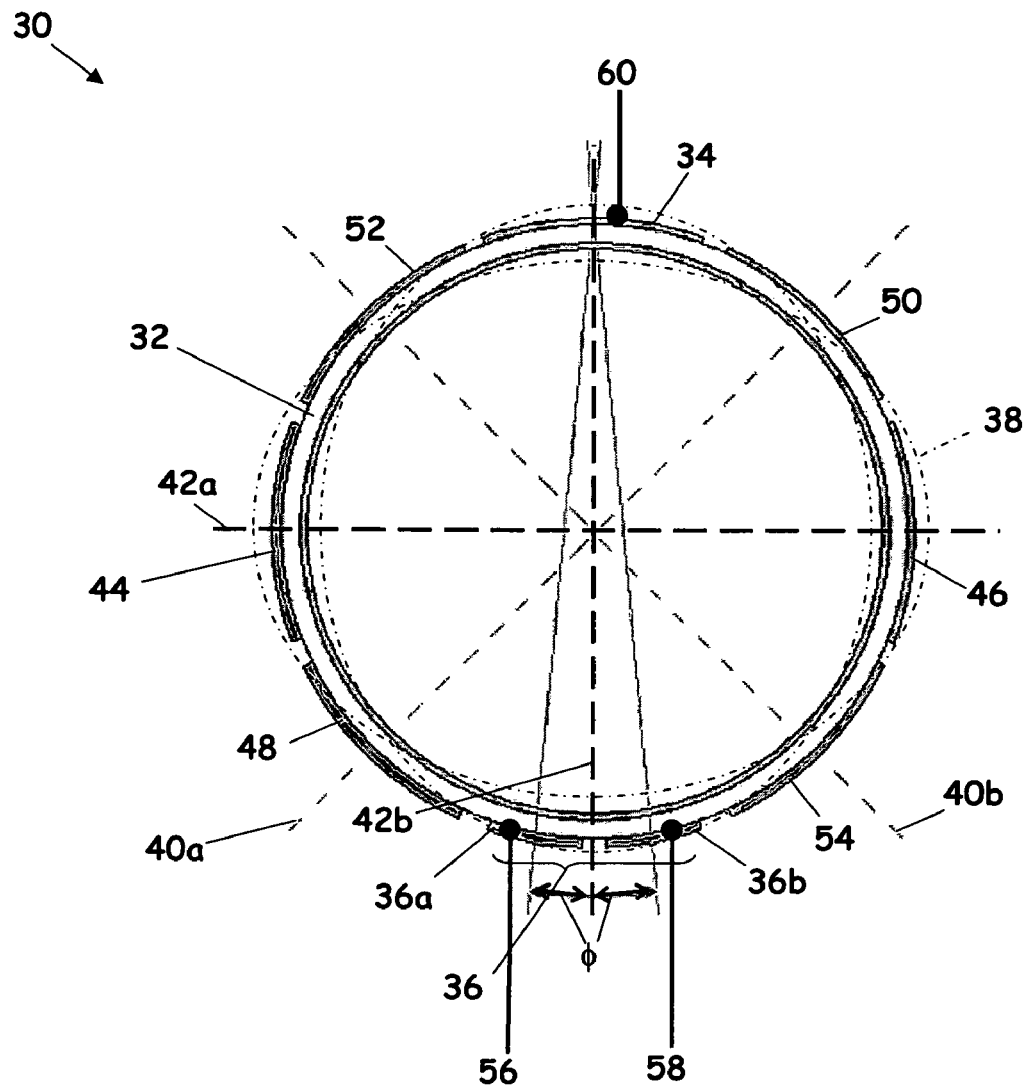
FIG. 1 is top view of a split drive electrode assembly for a cup electrode as known in the prior art.

Referring to FIG. 1, a split drive electrode assembly 30 for correcting undesirable oscillation alignment as is known in the prior art is depicted. The split drive electrode assembly 30 is comprised of a resonator 32 having a generally cylindrical cross-section and features two diametrically opposed drive electrodes 34 and 36, one of which is split into two electrically isolated electrodes 36a and 36b.

In operation, drive electrode 34 provides a drive signal to generate an oscillation or vibration pattern 38 (shown in phantom) characterized by a pair of node reference axes 40a and 40b, and a pair of antinode reference axes 42a and 42b. The node reference axes 40a and 40b are defined by the points on the vibration pattern 38 where the amplitudes of the oscillation are at local minima. In contrast, the antinode reference axes 42a and 42b are defined by the points on the vibration pattern 38 where the amplitudes of the oscillation are at local maxima. Functionally, the split drive electrode 36 provides a corrective drive signal that compensates for imperfections in the assembly that distort the oscillation pattern, such as electrode printing errors and mass differences in the conductor connections.

A pair of drive sense electrodes 44 and 46 sense the amplitude of the drive oscillation vector on the antinode reference axis 42b, which, in an ideal system is the same as the amplitude induced by the drive electrodes 34 and 36 on the antinode reference axis 42a. Accordingly, the drive sense electrodes 44 and 46 may provide a feed back signal to an automatic gain control or AGC (not depicted) for control of the drive amplitude delivered by the drive electrodes 34 and 36. The drive sense electrodes 44 and 46 are therefore dedicated to sensing the drive motion as an independent function and are not available to drive the cup oscillations.

A pair of node sense electrodes 48 and 50 are rotationally aligned with node reference axis 40a for sensing. Likewise, a pair of torque drive electrodes 52 and 54 are in rotational alignment with node reference axis 40b. The node sense electrodes on node reference axis 40a are connected together electrically and are dedicated to producing a rotation rate signal as an independent function. The torque drive electrodes 52 and 54 on node reference axis 40b are also connected together electrically, but are used to drive a "torquing" force on the cup as a dedicated and independent function.

In operation, a pair of drive voltages 56 and 58 are applied one each to the split drive electrodes 36a and 36b, respectively. The average of the voltages 56 and 58 set to equal a voltage 60 applied to the drive electrode 34. By adjusting the ratio of the voltages 56 and 58, the vibration pattern 38 may be rotated up to a displacement angle $\phi$ in either the clockwise or counterclockwise direction (i.e. a range from $+\phi$ to $-\phi$).

In practice, the split drive plate is used only for static alignment, and does not augment active torque adjustment. The torque function typically involves sensing a rotation rate from the sense electrodes 48 and 50, processing that information, and driving the resonator 32 with the torque drive electrodes 52 and 54. The torquing signal polarity typically is set to counter the existing node vibrations and the gain in signal processing is used to set a bandwidth for the overall response of the gyroscope. The scheme is also be used to control quadrature signals in the sensing system. However, this method of active torque adjustment requires the dedication of a pair of electrodes to serve the torquing function that could otherwise be used for sensing purposes.

The technique of splitting one of the drive electrodes suffers from a number of shortcomings. In order to maintain symmetry of the oscillation, the mass and size of all of the elements are matched as closely as possible. The asymmetry introduced by splitting the one drive electrode 36 adversely affects the overall uniformity and ability to maintain the desired oscillation mode. Additionally, the split drive electrode 36 requires two conductor connections instead of the single conductor utilized on the other elements. The additional mass of the second connection introduces further asymmetry that is deleterious to resonance performance.

Figure 2:
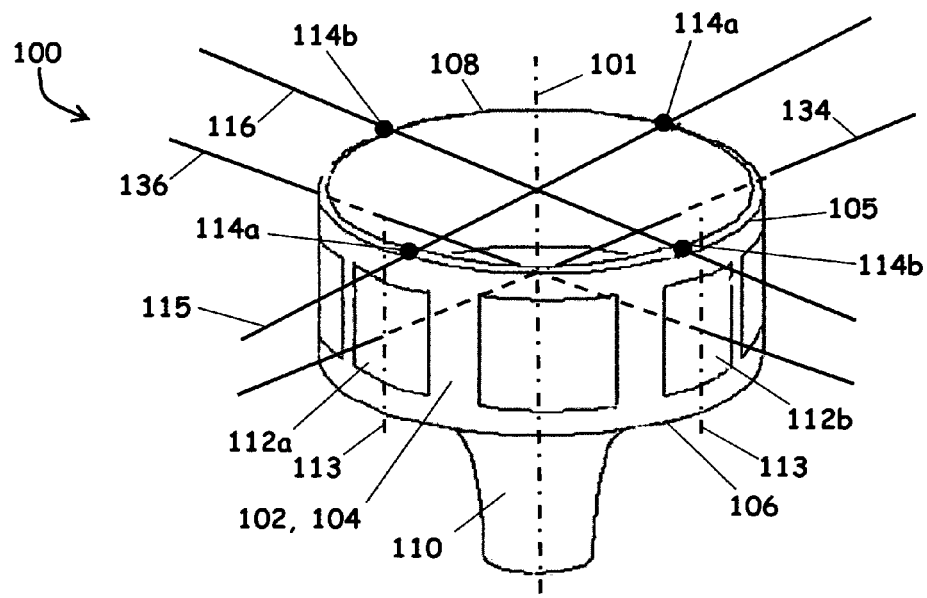
FIG. 2 is a perspective view of a cup electrode illustrating rotationally offset sense electrodes according to an embodiment of the present invention.
Figure 3:
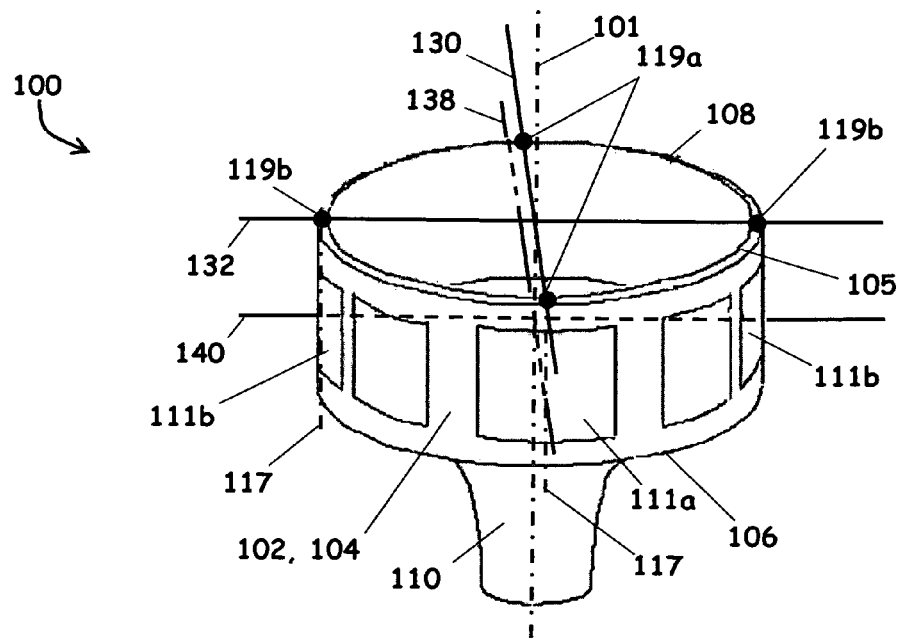
FIG. 3 is a perspective view of a cup electrode illustrating rotationally aligned driving electrodes according to the embodiment of FIG. 2.
Figure 4:
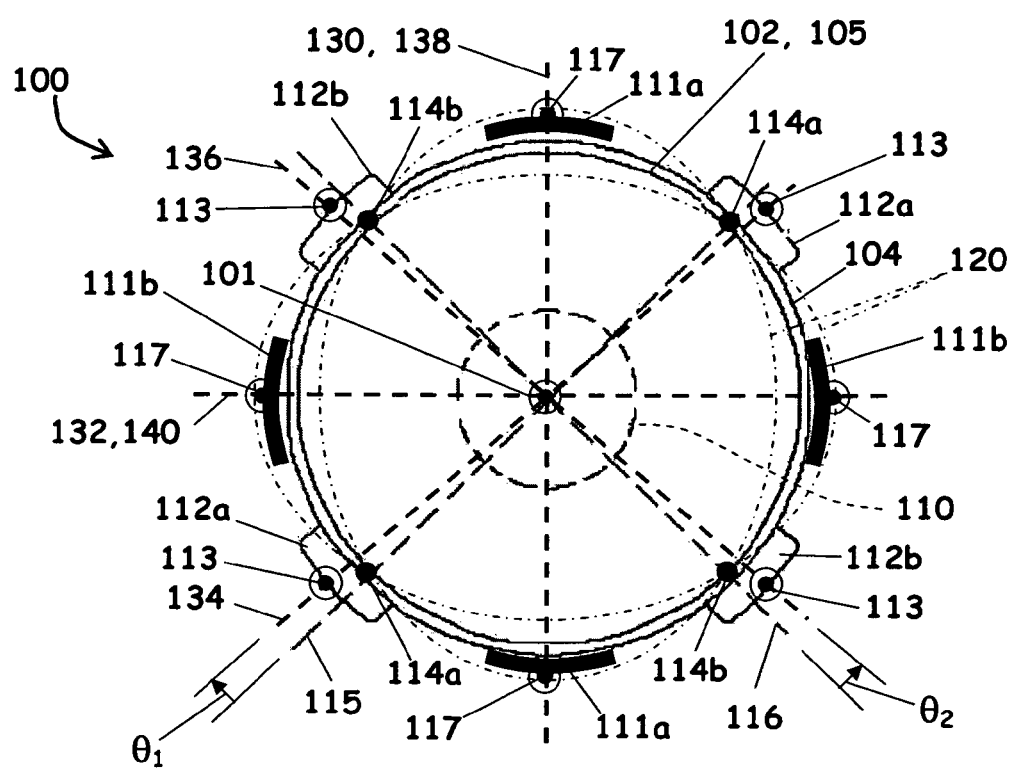
FIG. 4 is a top view of the cup electrode of FIGS. 2 and 3.

Referring now to FIGS. 2 through 4, an embodiment of the present invention in which an angular rate sensor is in the form of a cup assembly 100 is represented and described. The cup assembly 100 includes a resonant body 102 axisymmetric about a centerline 101 and having an outer surface 104, a proximal end 106 and a distal end 108. A stem 110 depends from the proximal end 106, and the distal end 108 defines a rim 105. Two pairs of drive electrodes 111a and 111b and two pairs of sense electrodes or "pickoffs" 112a and 112b are attached or otherwise operatively coupled to the outer surface 104 of the resonant body 102 adjacent the rim 105.

The term "electrode" as used herein may describe a conductor used to transmit signals or voltages both to and from a sense and/or drive element(s) and may also be used to refer to a portion or all of the sense and/or drive element(s) or a combination of the conductor(s) and/or sense and/or drive elements(s). A more generic descriptor is an "operational element," which is hereby defined for purposes of the present invention as an element that operates to either drive a vibration pattern or to sense a portion of a vibration pattern. Furthermore, an "operational element pair" is hereby defined for purposes of the present invention as a pair of operational elements wherein both operational elements of the pair operate to either drive or sense a vibration pattern.

Moreover, while the embodiments herein disclose operational element(s) in physical contact with the vibrating body, such as a coil, strip or plate, embodiments exist wherein the operational element(s) are not in physical contact, such as with capacitive and magnetic field sensors and excitation mechanisms. Also, the drive and/or sense elements may be comprised of physical mechanisms other than an electrical signal, such as a mechanical, optical or thermal transfer of energy.

In one embodiment, each of the sense electrodes or elements in the 112a and 112b pairs is characterized by a central axis 113 that is parallel to the centerline 101. Likewise, each of the drive electrodes or elements of pairs 111a and 111b are characterized by a central axis 117 that is parallel to the centerline 101. Node reference axes 115 and 116 each pass through a pair diametrically opposed oscillation nodes 114a and 114b, respectively, intersecting at or near the centerline 101. The oscillation nodes 114a and 114b are defined by locations on the rim 105 at which the amplitude of the vibrations induced by the drive element pairs 111a and 111b are at a local minimum (i.e. substantially equidistant between the drive element pairs 111a and 111b).

In some conventional designs, the sense element pairs 112a and 112b are positioned on the outer surface 104 of the resonant body 102 so that the central axes 113 of the sense elements pass through the oscillation nodes 114a and 114b. In contrast, the embodiment of FIGS. 2 through 4 depicts the sense element pairs 112a and 112b as rotationally displaced with respect to the oscillation nodes 114a and 114b. For example, as depicted in FIG. 4, the sense element pair 112a is displaced clockwise from the node reference axis 115 that passes through oscillation nodes 114a, and the sense element pair 112b is displaced counterclockwise with respect to the node reference axis 116 that passes through oscillation nodes 114b.

In the embodiment of FIGS. 2 through 4, a pair of sense axes 134 and 136 are defined as passing through the centroids of sense element pairs 112a and 112b, respectively. Also, a pair of drive element axes 138 and 140 are defined as passing through the centroids of the drive element pairs 111a and 111b, respectively. The sense axes 134 and 136 may be located on substantially the same plane as the drive element axes 138 and 140 to maintain resonant symmetry. The finite size of the various elements cause the rim, and therefore the vibration pattern 120, to be on a plane that is distinct from the sense axes 134 and 136 and the drive element axes 138 and 140.

In FIGS. 3 and 4, the centroids of the drive element pairs 111a and 111b are in rotational alignment with the antinode reference axes 130 and 132, whereas sense axes 134 and 136 are rotationally offset or "skewed" from the node reference axes 115 and 116, respectively, and each at respective skew angles $\theta_1$ and $\theta_2$.

In operation, the signal produced by each sense element pair 112a or 1112b is proportional to the vibration amplitude at its location. At a given node, for example, vibratory movement may be substantially zero, and the signal received by a sense element located near that node may be at a minimum. In contrast, a sense electrode or element located at either of the antinode reference axes produces a signal representative of the full drive vibration amplitude. Between these extremes the signal is generally proportional to the sine of a geometric constant times the angle $\theta_1$ or $\theta_2$ from the node. In a system having a vibration pattern characterized by two node reference axes, as in FIG. 4, the geometric constant is 2. More generally, the geometric constant is N, where N is the number of node reference axes in the vibration pattern.

In the embodiment of FIGS. 2 through 4, the skew angles $\theta_1$ and $\theta_2$ are of an equal magnitude $\theta$ (i.e. $\theta_1=\theta_2=\theta$), but are in opposite rotational directions. That is, the skew angle $\theta_1$ of the sense axis 134 is rotationally offset in a clockwise direction from node reference axis 115, whereas the skew angle $\theta_2$ of the sense axis 136 is rotationally offset from node reference axis 116 in a counterclockwise direction.

Accordingly, in a system having the vibration pattern 120 characterized by the two node reference axes 115 and 116, the signals generated by the sense element pairs 112a and 112b located on the sense axes 134 and 136 are:

$$S_1 = D \cdot \sin(2\theta) + DK \qquad \text{Eqn. (1)}$$

$$S_2 = D \cdot \sin(2\theta) - DK \qquad \text{Eqn. (2)}$$

where $S_1$ is the combined signal from the first sense element pair 112a located on the first sense axis 134, $S_2$ is the signal from the second sense element pair 112b axis 136, D is the driven oscillation signal as would be sensed at the point of maximum oscillation at the antinode reference axis 130, $\theta$ is the magnitude of the skew angle by which the sense axes 134 and 136 are offset with respect to the node reference axes 115 and 116, respectively, and DK is an angular rate sensing signal.

Figure 5:
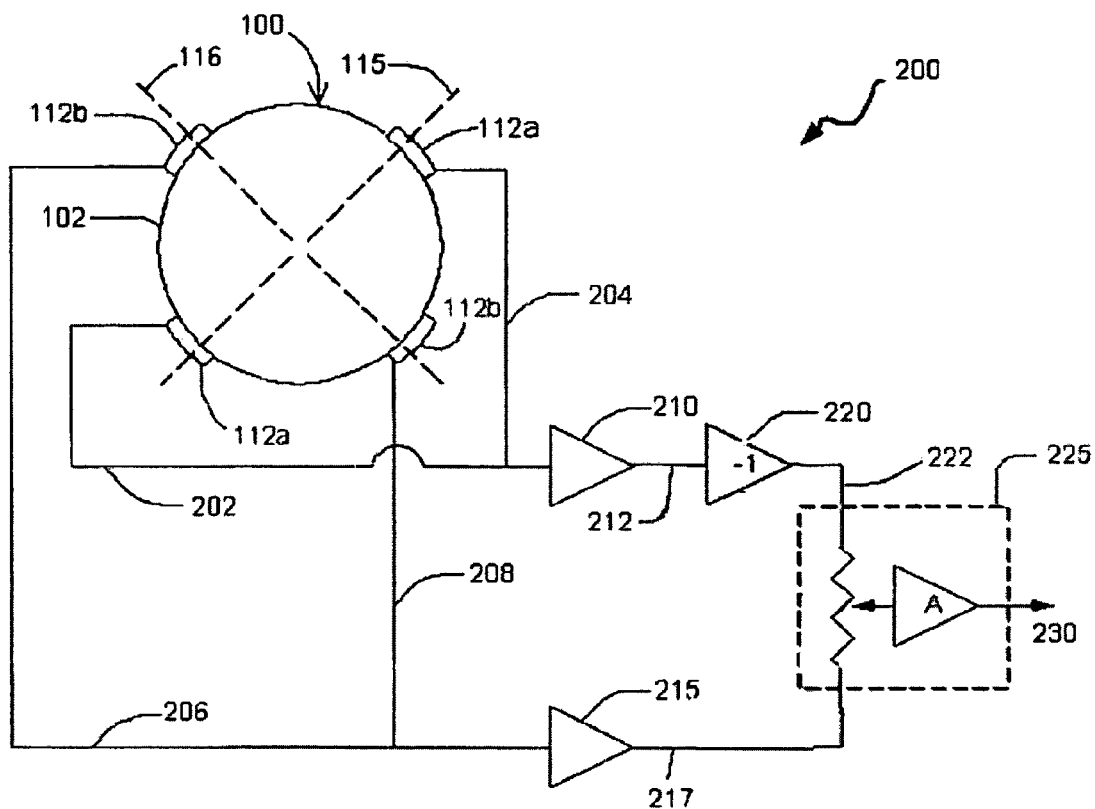
FIG. 5 is a schematic diagram of an embodiment of the control circuitry used to control the angular relationship between the drive and sense electrodes according to an embodiment of the present invention.

Referring to FIG. 5, a vibratory cup system 200 including the cup assembly 100 and control circuitry used to control the orthogonality between the two sense element pairs 112a and 112b is portrayed. Signal lines 202 and 204 transmit signals from the sense element pair 112a through a buffer 210.

Functionally, the buffer 210 produces a buffered sense output 212 indicative of the angular orientation of the node reference line 115 relative to the sense axis 134. Similarly, signal lines 206 and 208 transmit signals from the sense element pair 112b through a buffer 215 to produce a buffered sense signal 217 that represents the angular orientation of the node reference axis 116 relative to the sense axis 136. In one embodiment, an inverter 220 produces an inverted sense signal 222 having an opposite polarity relative to the sense signal 217. A rheostat 225 receives the buffered sense signal 217 and the inverted sense signal 222. The rheostat 225 adjusts the ratio between the buffered sense signal 217 and the inverted sense signal 222 to produce a ratio signal 230 that may be used to electrically position the node reference axes 115 and 116 relative to the sense element pairs 112a and 112b. In this way, the setting of the rheostat 225 for minimal drive signal at 230 can be determined.

Figure 6:
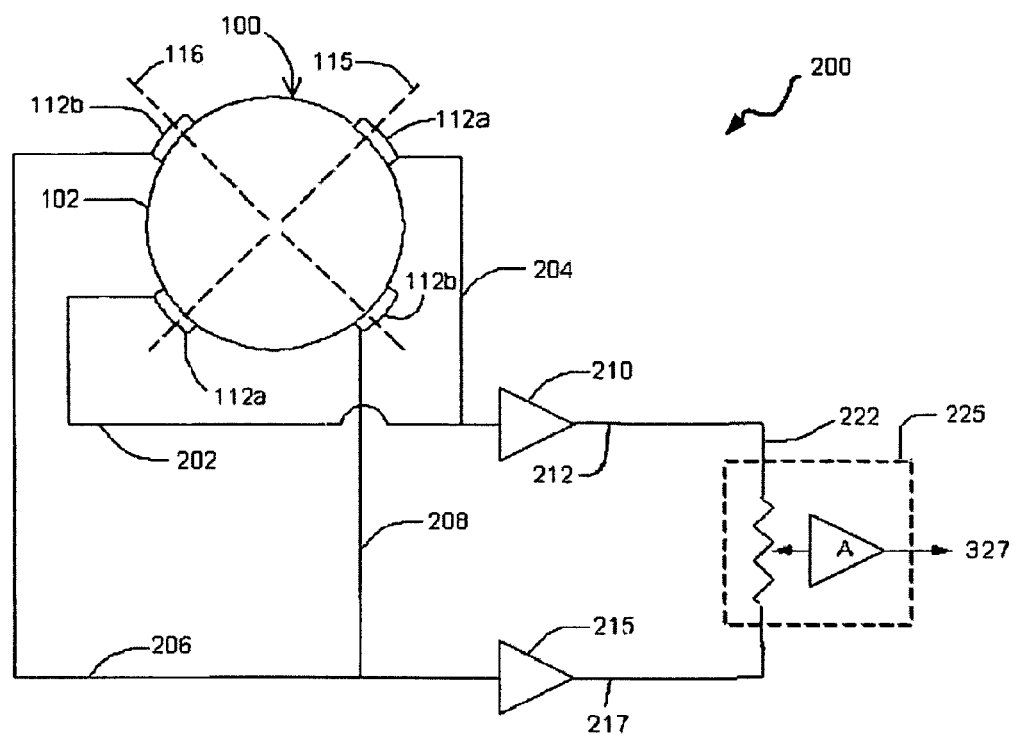
FIG. 6 is a schematic diagram of one embodiment of the control circuitry used to control the angular relationship between the sensing electrodes according to the present invention.

In an alternative embodiment, the inverter 220 may be omitted, as depicted in FIG. 6, thereby effectively summing the buffered sense signal 212 and the buffered sense signal 217. In this alternative implementation, the rate sense signal is canceled. By omitting the inverter 220, the predominant signal may be derived from the drive oscillation, and the rheostat 225 adjusts out the rate signal and leaves only the drive sensing signal at 327 which may be used to provide correction in a drive amplitude feedback loop, as described more fully below in connection with FIG. 9. Both functions can be implemented at the same time using signals 217 and 212 as the root of both operations.

Figure 10:
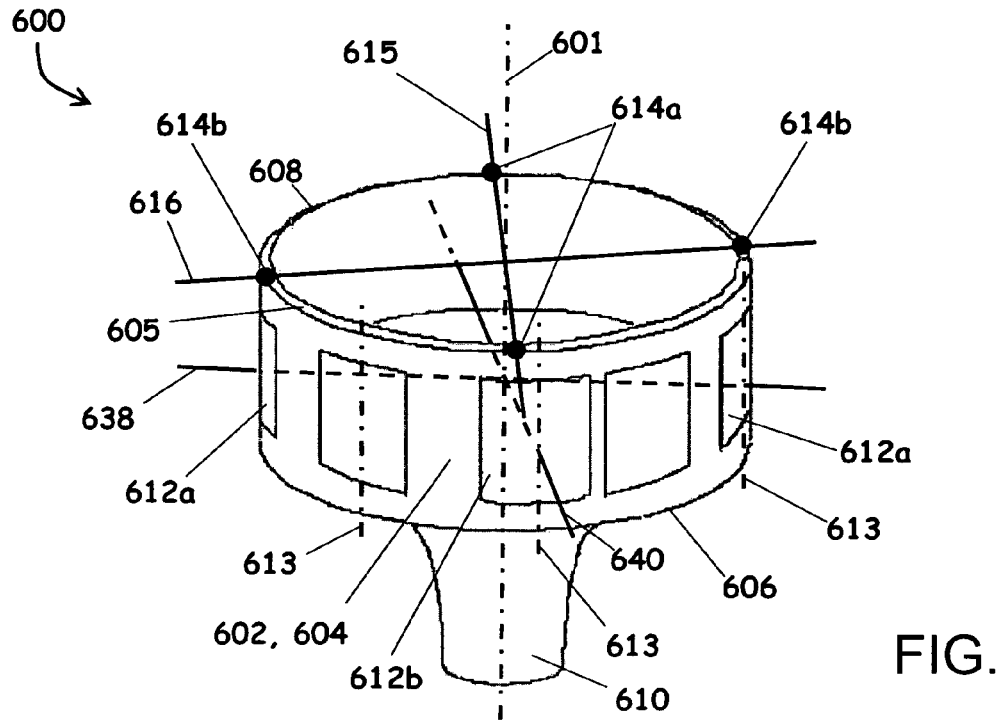
FIG. 10 illustrates a perspective view of an embodiment of the present invention highlighting the rotationally offset drive electrodes.
Figure 11:
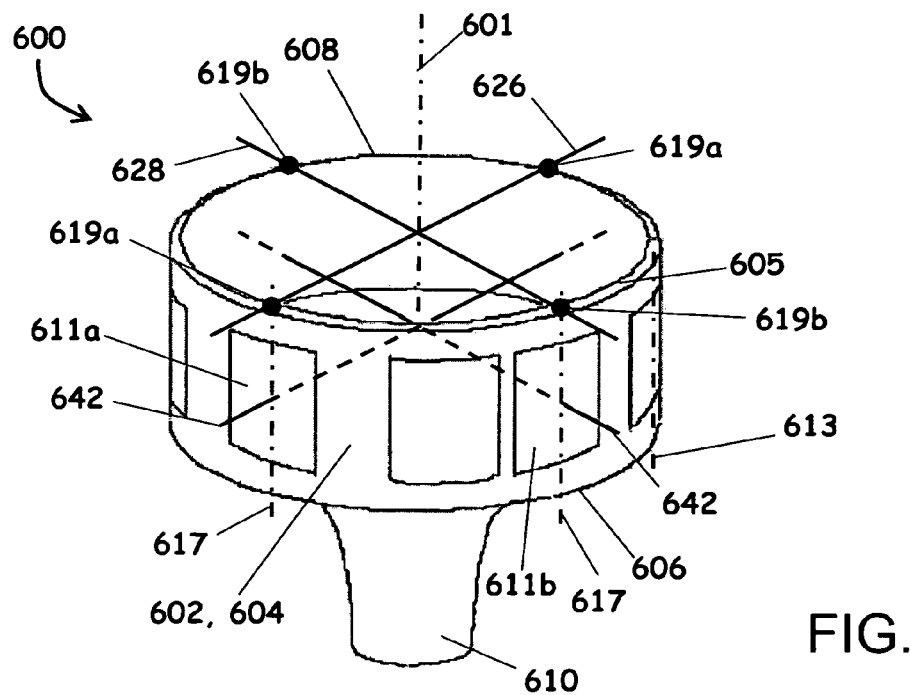
FIG. 11 illustrates a perspective view the embodiment of FIG. 10 highlighting aligned rotationally aligned sensing electrodes.
Figure 12:
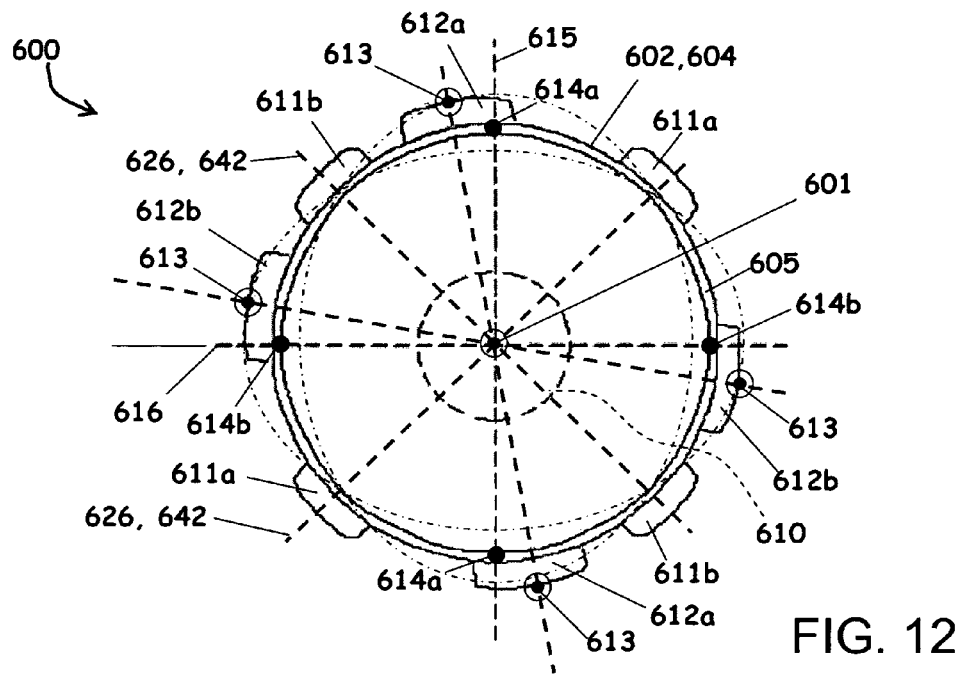
FIG. 12 illustrates a top view of the cup assembly of FIGS. 10 and 11.

Referring to FIGS. 10 through 12, another embodiment of the invention implements the skewing principle by applying a skew angle to the drive element pairs instead of the sense element pairs, and operates to change the position of the oscillatory nodes. A vibratory cup system 600 is depicted including a resonant body 602 that is substantially axisymmetric about a centerline 601 and has an outer surface 604, a proximal end 606 and a distal end 608. A stem 610 depends from the proximal end 606, and the distal end 608 defines a rim 605. Sense element pairs 611a and 611b and two pairs of drive elements 612a and 612b are operatively coupled to the outer surface 604 of the resonant body 602 adjacent the rim 605. Each of the drive elements in the 612a and 612b pairs may be characterized by a central axis 613 that may be parallel to the centerline 601. Likewise, each of the sense element pairs 611a and 611b are characterized by a central axis 617.

As with the skewed sense configuration (FIGS. 2 through 4), the embodiment of FIGS. 10 through 12 generates a four-node vibration pattern 620 that resonates on a resonant body 604, the vibration pattern 620 including the two pairs of antinodes 614a and 614b and two pairs of nodes 619a and 619b. The antinodes 614a and 614b define a pair of antinode reference axes 615 and 616, and the nodes 619a and 619b define a pair of node reference axes 626 and 628.

The centroids of the drive element pair 612a define a first drive element axis 638, and the centroids of the drive element pair 612b define a second drive element axis 640. The drive element axes 638 and 640 are rotationally offset from the antinode reference axes 630 and 632, respectively, each by a skew angle $\theta$. The skew angles $\theta$ may be of an equal magnitude but in opposite rotational directions. That is, the skew angle $\theta$ of the drive element axis 638 relative to the antinode reference axis 630 may be negative (clockwise), whereas the skew angle $\theta$ of the drive element axis 640 relative to the antinode reference axis 632 may be positive (counterclockwise).

In the embodiment depicted in FIGS. 10 through 12, the centroids of the sense element pairs 611a and 611b define a pair of sense element axes 642 and 644 that are in rotational alignment with the node reference axes 626 and 628.

In operation, a drive applied only to the element pair 612a on the first drive element axis 638 causes the vibration pattern 620 to rotate counterclockwise by an angle $\theta$ relative to the orientation of the vibration pattern 620 shown in FIG. 12, so that the antinode reference axis 615 aligns rotationally with the first drive element axis 638. On the other hand, if a drive is applied only to the second element pair 612b on drive element axis 640, the vibration pattern 620 is rotated clockwise by an angle $\theta$ so that the antinode reference axis 616 is in rotational alignment with the first drive element axis 640. Thus, the first drive element axis 638 may be said to have an opposite oscillation phase relative to the second drive element axis 640.

In this embodiment, if an equal drive force is applied to both drive element axes 638 and 640, the vibration pattern 620 does not rotate relative to the orientation of the vibration pattern 620 shown in FIG. 12. By this arrangement, the offset angle of the drive oscillation $\theta$ can be set to any value between $+\theta$ and $-\theta$ by adjusting the ratio of the signals applied to the two pairs of drive elements on the drive element axes 638 and 640.

In both the skewed sense configuration (FIGS. 2 through 4) and the skewed drive configuration (FIGS. 10 through 12), four elements are used to drive the oscillation pattern, which enables higher oscillation amplitudes to be achieved for a higher signal-to-noise ratio and better control of the mode of oscillation. A system that drives the vibration pattern along one axis only is prone to the creation of all even numbered harmonics (fundamental, 2, 4, 6, 8 . . . ). However, a system that is driven along two orthogonal axes, with the axes in opposing phase, is prone to fewer harmonic oscillations (i.e. fundamental, 4, 8, 16 . . . ).

Figure 7:
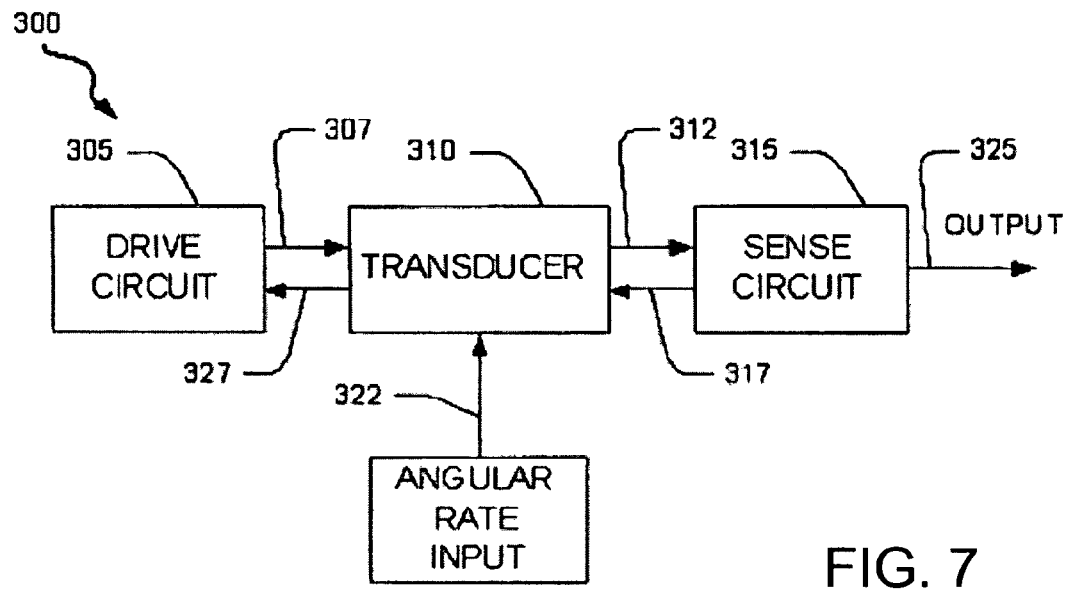
FIG. 7 is a generalized control diagram of a vibrating structure gyroscope according to an embodiment of the present invention.

Referring to FIG. 7 a generalized diagram of a vibrating structure gyroscope 300 (VSG) is depicted, utilizing a cup-type, bell-type, ring-type, or plate-type transducer with electrodes. A drive circuit 305 applies a controlled vibration 307 to a transducer 310, such as a cup electrode or other type of transducer, including, but not limited to, ring- and plate-type transducers. The transducer 310 transfers a portion of the vibration 307 to a sensing circuit 315 as a sensed vibration signal 312 when an angular motion 322 is applied, for example, when the gyroscope 300 is rotated from a nominal steady-state position. The sense circuit 315 transforms the sensed vibration signal 312 to produce an output signal 325 representative of the angular position change caused by rotation of the VSG 300. The sense circuit 315 additionally provides a control signal 317 as feedback to the transducer 310 to modify the response of the output signal 325. The control signal 327 may be used by the drive circuit 305 to control the level of oscillation which in turn controls the sensitivity of the gyroscope 300. One purpose of the feedback signal 317 is to counteract the vibrations from angular motions in the transducer thereby lowering the quality factor Q of the transducer and thus increasing the system bandwidth.

Figure 8:
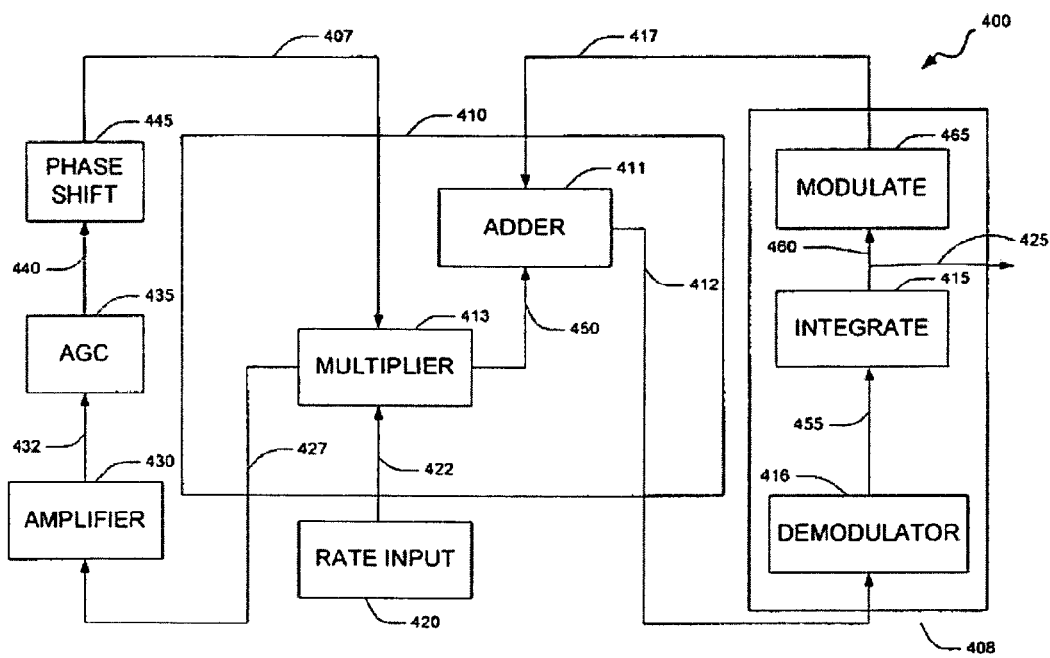
FIG. 8 is a block diagram of components of an example gyroscope model for use within a gyroscope system according to an embodiment of the present invention.

Referring to FIG. 8, an embodiment of the present invention is depicted that may be used within a gyroscope system. A gyroscope system 400 incorporates drive and sense circuits. A drive signal 407 passes to a transducer 410, which includes a phase shift function, an adder 411, and a multiplier 413. The multiplier 413 processes the drive signal 407. In particular, the multiplier 413 modulates an angular rate signal 422 from an angular rate input 420 as a function of the drive signal 407. The driven oscillations are monitored through a drive sense signal 427. The drive sense signal 427 may be transmitted to an amplifier 430 to produce an amplified drive correction signal 432 that may in turn be transmitted to an automatic gain control (AGC) circuit 435. The AGC circuit 435 may then produce an adjusted drive signal 440 tailored to overcome inaccuracies and to provide sufficient amplitude to maintain consistent drive to the transducer in the transducer 410. The adjusted drive signal 440 may be further processed by a phase shifter 445 to correct any phase shift that resulted within the transducer and during the signal processing and produces the drive signal 407.

The multiplier 413 in the embodiment of FIG. 8 generates a force signal 450 based upon the angular rate signal 422. The force signal 450 may be transmitted to the adder 411 to be added to a control signal 417, producing a vibration signal 412. The vibration signal 412 may then be transmitted to a sensing demodulator 416, which produces a rectified sine wave signal 455. An integrator 415 may further process the rectified sine wave signal 455 to produce an output signal 425 representative of the angular position change caused by gyroscope rotation. The integrator 415 also transmits an adjusted output signal 460 to a modulator 465, which converts the adjusted output signal 460 to the control signal 417. In this way, the system realizes a closed loop or torque loop 408 that seeks to force the vibrations at the sense element pairs 112a and 112b to zero. The torque loop 408 provides improved bandwidth and linearization of the gyroscope system 400. The effect of the torque loop 408 is to rotate the oscillation pattern to reduce transducer vibration in the sense direction, to assist the dissipation of sense deflections, and to serve as an effective method to increase the bandwidth of the rate signals in conditions of systems having a high quality factor Q.

Figure 9:
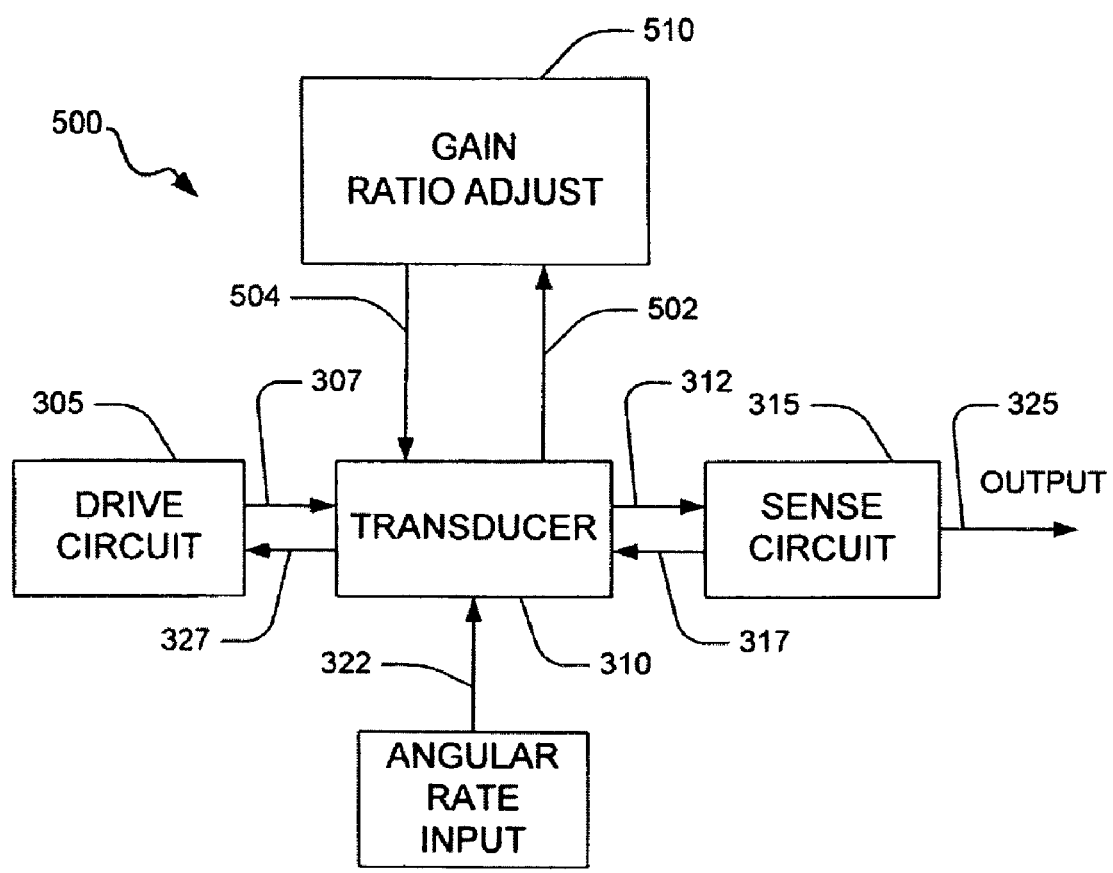
FIG. 9 illustrates an embodiment with the gain ratio adjust circuitry incorporated into a gyroscope system according to an embodiment of the present invention.

Referring to FIG. 9, an embodiment that incorporates a gain ratio adjustment subsystem 510 into a gyroscope system 500 is depicted. The gain ratio adjustment subsystem 510 may comprise an angular rate sensing, a drive vibration sensing, or both in combination, as described above. For example, the control signal 327 may be adjusted to be all drive vibration sensing signal and the sensed vibration signal 312 may be adjusted to be all rate sensing signal. The gain ratio adjustment subsystem 510 receives as input a gain input signal 502, for example, via the sense signal lines 202, 204, 206 and 208 of FIG. 5.

A mode of vibration is represented by a vibration or oscillation pattern 120 (shown in phantom in FIG. 4) having the two node pairs 114a and 114b, each node being defined as a position on the vibration pattern where the amplitude of the vibration is at a local minima. The vibration pattern 120 may be carried on the rim 105 of the resonant body 102. The resonant body 102 may be of a variety of shapes, including, without limitation, a hemisphere, a cone, or other cup-shaped geometries. With a four-node vibration pattern, the nodes of the node pairs 114a and 114b define the node reference axes 115 and 116 as being substantially orthogonal to each other.

A vibration pattern also includes a plurality of "antinodes," i.e. the location where the vibration pattern is at a local maxima. For the four-node vibration mode of vibration pattern 120, there are two antinode pairs 119a and 119b, depicted in FIG. 3. Each antinode pair 119a and 119b defines an antinode reference axis 130 and 132, respectively. The central axes 117 of the drive element pairs 111a and 111b are aligned with the "antinode" points of the oscillation pattern 120. The antinode reference axes 130 and 132 are rotationally offset from the node reference axes 115 and 116 at substantially a 45° angle. Accordingly, antinode reference axes 130 and 132 are also substantially orthogonal. Other modes of vibration may define a different number of nodes, and thus a different number of node reference axes and antinode reference axes with different angular relationships.

In one embodiment, the gain ratio adjustment subsystem 510 of FIG. 9 may be used to adjust the alignment of the sense axes 134 and 136. By adding and subtracting the signals $S_1$ and $S_2$, the drive sense signal D and the angular rate sensing signal DK can be determined respectively. In particular, the rate sensing signal DK can be obtained as a function of the difference between the signals received from the sense element pairs 112a and 112b located on the sense element axes 134 and 136:

$$S_1 - S_2 = 2DK \qquad \text{Eqn. (3)}$$

The drive sensing signal D can be obtained as a function of the sum of the signals from the sense element axes:

$$S_1 + S_2 = 2D \cdot \sin(2\theta) \qquad \text{Eqn. (4)}$$

With an ideal product, the two sense element axes 134 and 136 are perfectly aligned (i.e. are offset by the same skew angle θ). However, with a real world product, the two sense element axes 134 and 136 are not in perfect alignment. By making slight adjustments in the gain balance between the two sense outputs via the gain ratio adjustment subsystem 510 of FIG. 9, alignment errors can be compensated.

Referring again to FIGS. 10 through 12, the principles outlined above may be applied to rotate the vibration pattern 620 (i.e. the antinode reference axes 615 and 616 and the node reference axes 626 and 628) by changing the gain ratio for the two drive element pairs 612a and 612b.

The gain ratio adjustment subsystem 510 can be used to adjust the alignment of the antinode reference axes 615 and 616. The base signal of $S_1 - S_2$ can be substantially zeroed when the sensor is at rest. Dynamic adjustment may facilitate the damping of displaced driven vibrations, which can be used as a torque mechanism to extend the bandwidth of the gyroscope output or to control quadrature oscillations. Moreover, the foregoing may be accomplished with fewer connections than in the split drive electrode assembly 30 (FIG. 1), thereby enhancing the simplicity and symmetry for better resonance performance.

Certain embodiments have been described above in connection with a cup-type vibrating structure. The principles described herein can be applied to other gyroscope configurations, such as gyroscopes employing ring and plate type vibrating structures. In such implementations, like the cup implementation described herein, the sensing and driving elements, which use capacitive or magnetic sensing and driving, are skewed from the typical orientation by a small angle. The same functions and advantages discussed above may be produced as a result.

Figure 13:
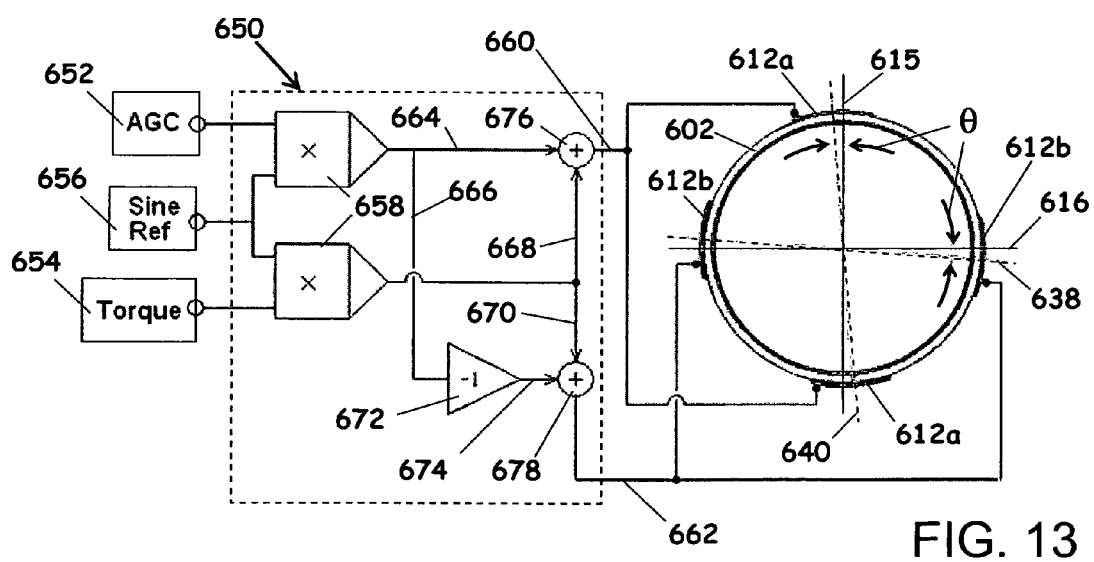
FIG. 13 is an active torque drive circuit according to an embodiment of the present invention.

Referring to FIG. 13, an embodiment of an active torque drive circuit 650 is depicted. The torque drive circuit 650 receives three inputs: an AGC signal 652, a torque signal 654 and a sine reference or drive reference frequency 656. The AGC signal 652 is indicative of the controlled drive voltage applied to the drive element pairs 612a and 612b. The torque signal 654 constitutes the feedback signal received from the sense element pairs 611a and 611b.

The AGC signal 652 and torque signals 654 are routed through separate multipliers 658 that multiply the respective signals by the sine reference 656 to modulate a pair of outputs 660 and 662 of the torque drive circuit 650. The outputs of the multipliers 658 are split so that there are two modulated AGC signals 664 and 666 and two modulated torque signals 668 and 670. One of the split signals—in the FIG. 13 embodiment it is modulated AGC signal 666—is routed through an inverter 672 for to produce a modulated inverted AGC signal 674. The modulated AGC signal 664 and the torque signal 668 are routed through a first adder 676, and the inverted modulated AGC signal 674 and the torque signal 670 are routed through a second adder 678 to produce the outputs 660 and 662 of the torque drive circuit 650 that source the drive element pairs 612a and 612b.

The torque drive circuit 650 may be utilized to adjust the drive vibration vector angle proportionate to the torque signal amplitude. The formulations that apply to the FIG. 13 embodiment are as follows:

$$V_{D1} = V_T \sin(\omega) + V_C \sin(\omega) \quad \text{Eqn. (5)}$$

$$V_{D2} = V_T \sin(\omega) - V_C \sin(\omega) \quad \text{Eqn. (6)}$$

where: $V_{D1}$ and $V_{D2}$ are the drive signals 660 and 662 applied to drive element pairs 612a and 612b, respectively; $V_C$ is the AGC signal 652; $V_T$ is the torque signal 654; and $\omega$ is the drive reference frequency.

Operationally, if $V_T = V_C$, then $V_{D2} = 0$ and the system is driven substantially along drive element axis 640, causing the antinode reference axis 615 to rotate the full skew angle $\theta$ in a counterclockwise direction from the nominal orientation. But if $V_T = -V_C$, then $V_{D1} = 0$ and the system is driven along drive element axis 638, causing the antinode reference axis 616 to rotate the full skew angle $\theta$ in a clockwise direction from the nominal orientation. The antinode reference axes 615 and 616 can be shifted electronically to intermediate angular orientations by the formula:

$$\theta_D = -\theta \cdot V_T / V_C \quad \text{Eqn. (7)}$$

where $\theta_D$ is the angular orientation of the drive vector relative to the nominal orientation depicted in FIG. 12.

Figure 14:
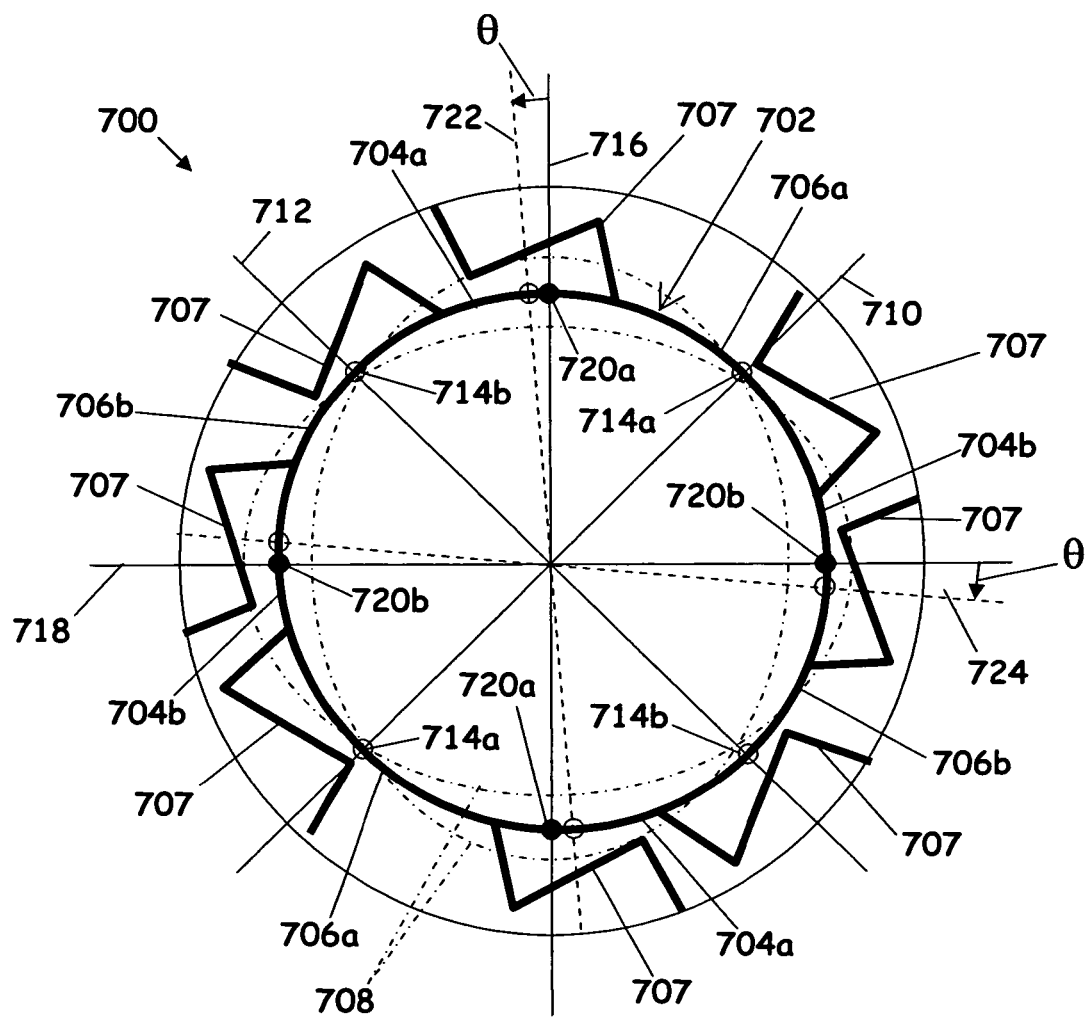
FIG. 14 is a plan view of a ring-type electrode illustrating skewed drive elements according to an embodiment of the present invention.

Referring to FIG. 14, for example, an embodiment in which an angular rate sensor is in the form of a ring gyroscope 700 is depicted. The ring gyroscope 700 may operate electromagnetically, piezoelectricly or capacitively. The gyroscope employs a ring 702 on which two pairs of drive elements 704a and 704b and two pairs of sensing elements 706a and 706b are disposed. A plurality of so-called "spider web legs" 707 extend outward from the ring 702. The centers of the drive element pairs 704a and 704b and sensing element pairs 706a and 706b are established as the center of an arc portion of the ring 702 between adjacent spider web legs 707 (indicated by the open circles on the ring 702). A four-node vibration pattern 708 is depicted with node reference axes 710 and 712 that are aligned with two pair of the oscillation nodes 714a and 714b, and antinode reference axes 716 and 718 that are aligned with two pair of oscillation antinodes 720a and 720b.

In the FIG. 14 embodiment, the sensing element pairs 706a and 706b are centered on the node reference axes 710 and 712. (Note that the centers of the drive elements in the sensing element pairs 706a and 706b are aligned with the oscillation nodes 714a and 714b.) However, the drive element pairs 704a and 704b are displaced from the nominal antinode reference axes 716 and 718 by a skew angle $\theta$. The centers of the drive element pairs 704a and 704b define a first and a second drive element axis 722 and 724, respectively.

In operation, if only the drive element pair 704a is activated, the vibration pattern 708 is rotated counterclockwise by the skew angle $\theta$. On the other hand, if only the drive element 704b pair is activated, the vibration pattern 708 is rotated clockwise by the skew angle $\theta$. Thus, the drive element axis 722 has an opposite oscillation phase relative to drive element axis 724. Accordingly, if drive amplitudes are applied equally through both drive element pairs 704a and 704b, the oscillation pattern is not rotated from the nominal position depicted in FIG. 14. The offset angle of the drive oscillation $\theta$ can therefore be set to any value between $+\theta$ and $-\theta$ by adjusting the ratio of the drive amplitudes applied by the two pairs of drive elements on drive element axes 722 and 724. The gain ratio adjustment subsystem 510 of FIG. 9 may be used for this purpose.

Figure 15:
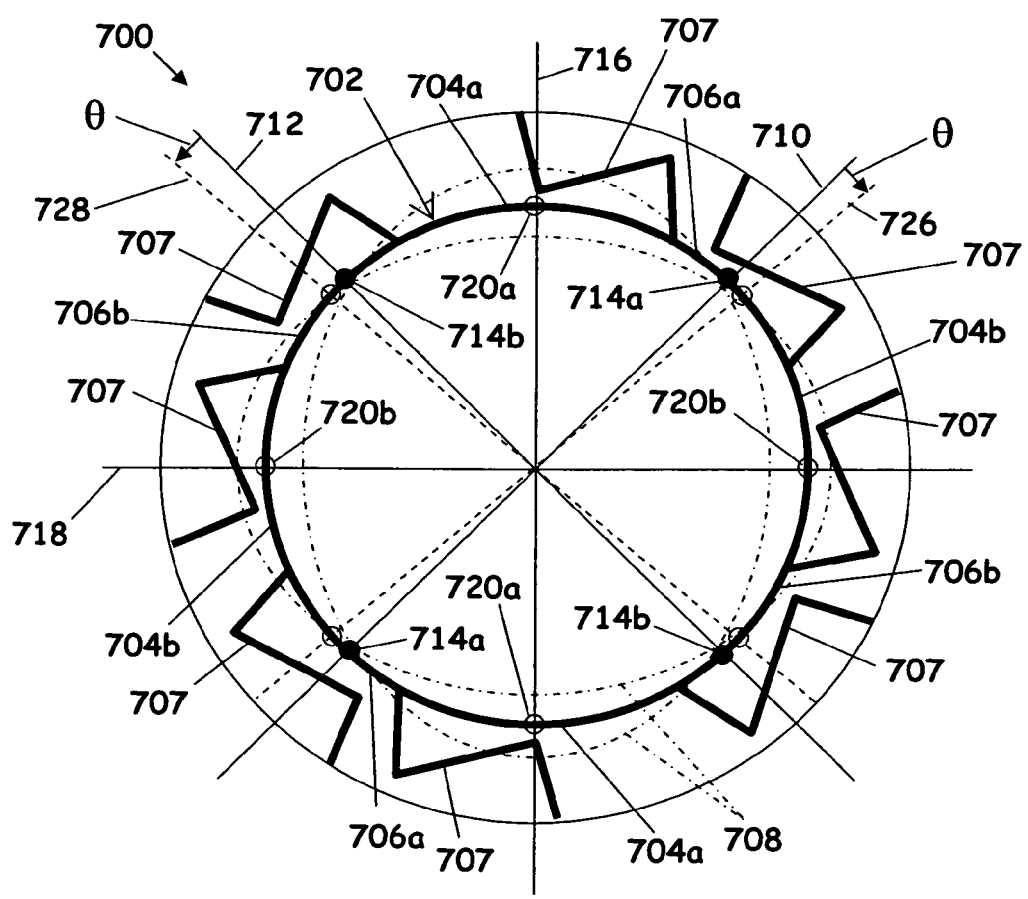
FIG. 15 is a plan view of the ring-type electrode of FIG. 14 configured to skew the sensing elements.

Referring to FIG. 15, and as a further example embodiment, the centers of the sensing element pairs 706a and 706b may be displaced with respect to the node reference axes 710 and 712. The FIG. 15 embodiment represents the centers of the drive element pairs 704a and 704b are coincident with the antinode reference axes 716 and 718. (Note that the centers of the drive elements in the drive element pairs 704a and 704b are aligned with the oscillation antinodes 720a and 720b.) But the centers of the diametrically opposed sensing element pair 706a, represented by a sensing axis 726, are displaced by the skew angle $\theta$ in the clockwise direction with respect to the respective node reference axes 710. To affect the opposite oscillation phase, the centers of the alternate sensing elements 706b, represented by a sensing axis 728, are displaced by the skew angle $\theta$ in the counterclockwise direction with respect to the node reference axes 716. The signal produced by each of the sensing element pairs 706a and 706b is proportional to the vibration amplitude at its location. The derivation of the mathematical equations leading to the summation and the subtraction of element signals to determine the drive sensing and the rate sensing signals is the same as with the resonant body 602 presented in Eqns. (1) through (4).

The silicon ring-type gyroscope illustrated in FIGS. 14 and 15 may offer a number of advantages relative to some conventional ring-type gyroscope designs. For instance, drive sensing and rate sensing functions can be implemented using the same sensing elements 706. In the embodiment represented in FIGS. 14 and 15, the AGC circuit can be used to correct drift of the drive biases of the gyroscope associated with aging. The characteristics of the drive sensing and rotation rate sensing functions do not vary substantially with respect to each other because these functions are implemented using the same components, with sensing elements 706 fabricated from the same type of material and using the same joining techniques.

Certain principles discussed above can be applied to other vibrating gyroscope configurations such as tuning fork type gyroscopes and plate type gyroscopes, discussed below. However, the skewed drive embodiments are applicable only in systems having more than one node. Two or more nodes enable the redirected drive energy of one node to be compensated by an equal and opposite action at the other node. Nevertheless, the principles of the skewed sense configuration are applicable to gyroscopes having only one node, such as a tuning fork gyro.

Figure 16:
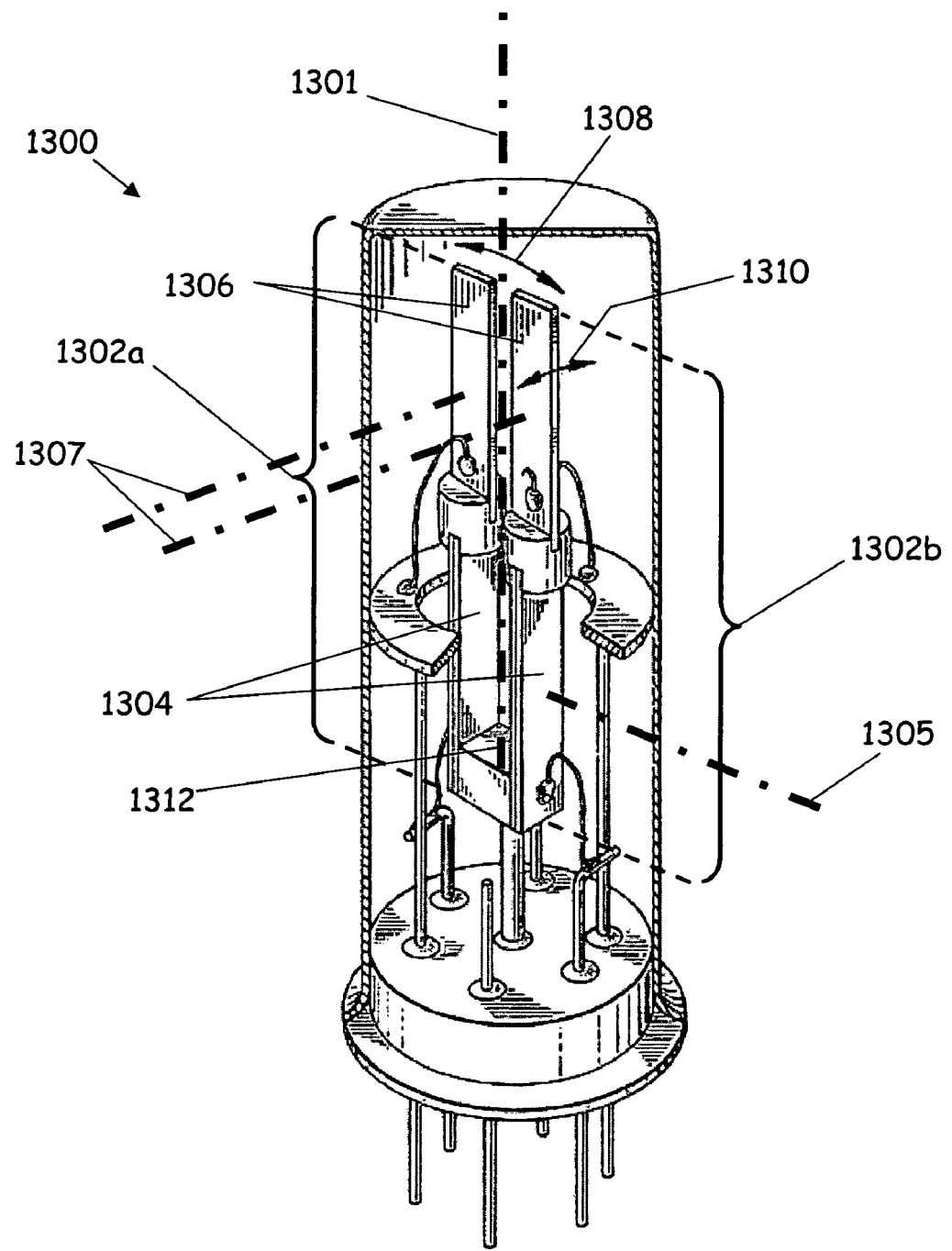
FIG. 16 illustrates a tuning fork type gyroscope.
Figure 17:
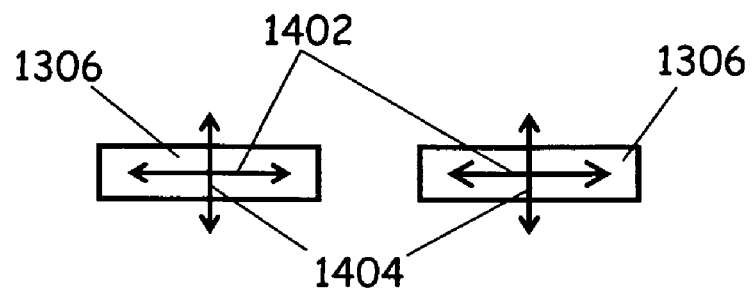
FIG. 17 is a cross-sectional view of a pair of sense electrodes of the tuning fork gyroscope of FIG. 16.

Referring to FIGS. 16 and 17, a gyroscope 1300 having a tuning fork-like arrangement about a rotation sensing axis 1301 as is known in the prior art is illustrated. The resonant frequency of the driven fork oscillations and the rate sensing response are substantially the same. The gyroscope 1300 has tines 1302a and 1302b, each comprised of a drive element 1304 having a drive axis 1305 and a sense element 1306 having a sensing axis 1307 perpendicular to the major faces of the sense element 1306. The drive elements 1304 are excited in such a way that causes tines 1302a and 1302b to oscillate in the direction indicated by vector 1308. When the gyroscope 1300 is rotated about the sensing axis 1301, the sense elements 1306 flex in the direction indicated by vector 1310, generating a voltage signal amplitude proportional to the angular velocity of the gyroscope 1300 about the rotation sensing axis 1301. However, the oscillation of the tines 1302a and 1302b in the direction of vector 1308 also imparts some degree of flexure to the sense elements 1306 in the direction of vector 1310. In some cases, this small amount of flexure may be sufficient to cause the piezoelectric materials from which the sense elements 1306 are formed to produce a small voltage signal that erroneously indicates that the gyroscope 1300 is rotating, even when it is not. Further, this small voltage signal introduces a margin of error when the gyroscope 1300 is rotating, potentially causing the gyroscope 1300 to indicate an erroneous angular velocity.

When the tines 1302a and 1302b (FIG. 16) are driven by an AC voltage, they resonate in opposition as illustrated by vectors 1402. The sense elements 1306 respond to rotation rate oscillation vectors 1404 that theoretically respond only to the rotation rate of the gyroscope 1300 because the rotation rate oscillation vectors 1404 are normal to the resonant vectors 1402.

Figure 18:
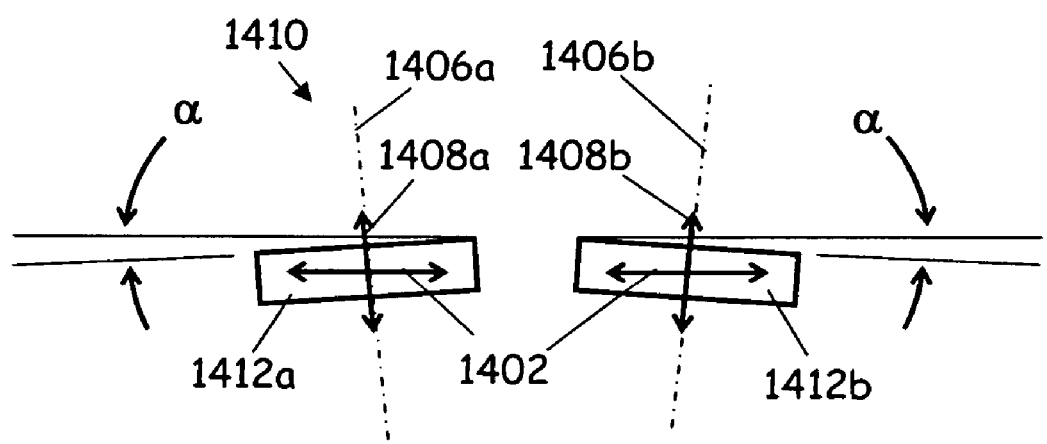
FIG. 18 is a cross-sectional view of a pair of skewed sensing electrodes for a tuning fork gyroscope according to an embodiment of the present invention.

Referring to FIG. 18, a configuration 1410 utilizing a pair of skewed sense elements 1412a and 1412b to replace the planar sense elements 1306 in vibrating fork gyroscope 1300 is depicted in accordance with one embodiment of the present invention. Because the tuning fork gyroscope 1300 has only one node at a base 1312 (FIG. 16), application of the skew principle takes on a different configuration than disclosed for polar geometries. The sense elements 1412a and 1412b are skewed at a slight skew angle α, as depicted in FIG. 18, without any skew on the drive elements 1304 (FIG. 16), and the drive vectors 1402 remain in opposition. However, the skew angle α causes the sense elements 1412a and 1412b to be oriented according to a pair of sensing axes 1406a and 1406b, respectively. Accordingly, the sense elements 1406a and 1406b sense a response vector 1408a and 1408b, respectively, comprised of a portion of the drive vector 1402 and a portion of the rotation rate oscillation vector 1404. That is, because the sense axes 1406a and 1406b of the sense elements 1406a and 1406b are not orthogonal to the drive vector 1402, the sense elements 1406a and 1406b detect the response vectors 1408a and 1408b having components from both the drive vector 1402 and the rotation rate oscillation vectors 1404.

The portion of the drive vector 1402 sensed along axes 1406a and 1406b is substantially proportional to $\sin(\alpha)$. Also, sense axes 1406a and 1406b are oriented so the component of the respective response vectors 1408a and 1408b attributed to the drive vectors 1402 to are of equal magnitude but in opposite directions.

Despite the differences in the geometric configurations, the mathematical derivations are similar to the derivations for the ring and cup geometries, as described in connection with Eqns. (1) and (2). Specifically:

$$S_1 = D \sin(\alpha) + DK \quad \text{Eqn. (8)}$$

$$S_2 = D \sin(\alpha) - DK \quad \text{Eqn. (9)}$$

where: $S_1$ is the signal from the first sense element 1412a; $S_2$ is the signal from the second sense element 1412b; D is the driven oscillation signal as would be sensed at the point of maximum oscillation (i.e. at the drive axis 1305); α is the skew or offset angle of the sense elements 1412a and 1412b relative to the direction of the drive vectors 1402; and DK is the signal corresponding to an angular rate of change about the rotation sensing axis 1301. Subtracting the second element signal from the first element signal gives a maximum rate signal and cancels the drive sensing signal:

$$S_1 - S_2 = 2DK \quad \text{Eqn. (10)}$$

Gain adjustment may be used to correct this balance for sensor variations. Adding the first and second element signals gives a maximum drive sensing signal and cancels the rate signal:

$$S_1 + S_2 = 2D \sin(\alpha) \quad \text{Eqn. (11)}$$

Figure 19:
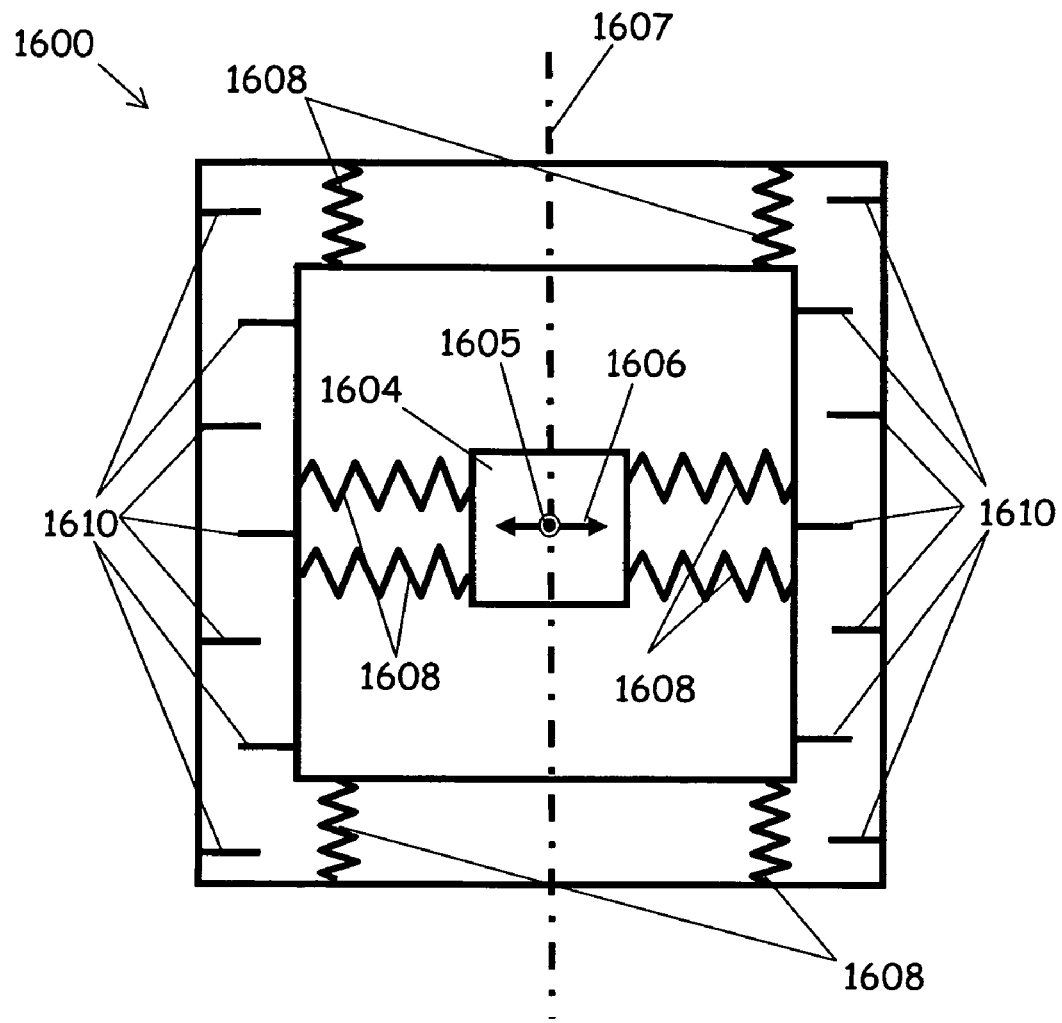
FIG. 19 is a schematic of a plate gyroscope.

Referring to FIG. 19, an element 1600 of a gyroscope configuration known as a plate gyroscope is schematically depicted. The resonant frequency of the driven plate oscillations and the rate sensing response are substantially the same. The plate gyroscope element 1600 is a planar micro-electro-mechanical system (MEMS) gyroscope that includes an inner frame 1602 and a resonating mass 1604 that may be driven in the direction indicated by a vector 1606 perpendicular to a sense axis 1607. The rotation rate input axis 1605 is substantially at the center of the resonating mass and is substantially orthogonal to both the vector 1606 and the sense axis 1607 (i.e. perpendicular to the plane of FIG. 19). The plate gyroscope element 1600 includes spring elements 1608 and may also include a plurality of Coriolis sense fingers 1610.

Figure 20:
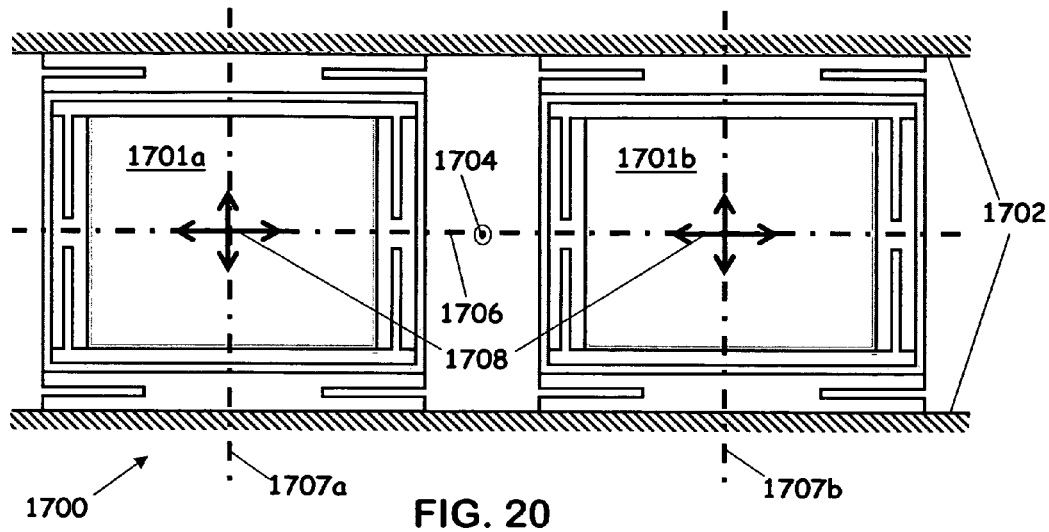
FIG. 20 illustrates a plan view of a pair of plates in a plate type gyroscope.

Referring to FIG. 20, an operational plate gyroscope 1700 comprising two plate elements 1701a and 1701b that embody the operational characteristics of the schematically depicted plate gyroscope element 1700 is portrayed. The operating principles of the plate gyroscope 1700 depicted in FIG. 20 are similar to the tuning fork gyroscope 1300 of FIGS. 16 and 17. Typically, the plate elements 1701a and 1701b are supported by a framework 1702 define a pair of sensing axes 1707a and 1707b that are substantially parallel. The two plate elements 1701a and 1701b vibrate in opposition to each other, similar to the tines 1302a and 1302b of the tuning fork gyroscope 1300 described in connection with FIGS. 16 through 18, and are sensitive to rotation about a rotation rate sensing axis 1704.

The two plate elements 1700a and 1700b are driven along a common drive axis 1706 in linear opposition as illustrated by a pair of drive vectors 1708. In this implementation, the drive mechanism is typically electrostatic attraction and repulsion rather than piezoelectric effects. In the FIG. 20 configuration, the sensing axes 1707a and 1707b are made as orthogonal as possible to the drive axis 1706 to provide the purest rate-sensing signal possible. However, by sensing only the rotation rate, the FIG. 20 configuration requires a separate drive sensing mechanism independent from the rate sensing system.

Figure 21:
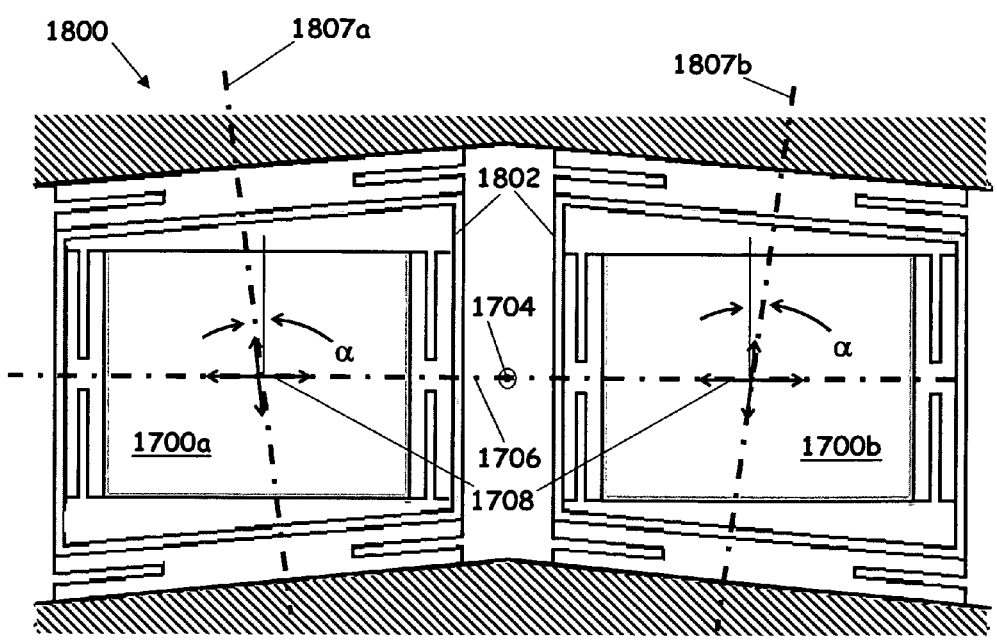
FIG. 21 illustrates a plan view of a skewed plate type gyroscope according to an embodiment of the present invention.

Referring to FIG. 21, an embodiment of a skewed plate gyroscope 1800 according to the present invention is depicted. As in the FIG. 20 configuration, the plate elements 1700a and 1700b are in a parallel arrangement, having the common drive axis 1706 to produce the drive vectors 1708 in linear opposition. (Alternatively, the plate elements need not share a common drive axis 1706, but may have drive axes that are merely parallel to each other.) However, translational framework 1802 may be skewed at a slight angle α, causing a pair of sensing axes 1807a and 1807b to also be skewed at a skew angle α. Like the skewed fork arrangement of FIG. 18, the sensing elements of the skewed plate gyroscope detect both a drive component and a sense component.

Functionally, the coincident or parallel arrangement of the drive axes 1706 cause the drive vectors 1708 to remain in opposition; however, the sensing axes 1807a and 1807b are not orthogonal to the drive axes 1706 and sense a portion of the drive oscillation in addition to the signal from rotation rates, thereby producing both a rate sensing and a drive sensing capability as described in Eqns. (8) through (11).

The optimization of the skew angles α and θ for the various embodiments described herein may be calculated from the operational parameters that characterize the system, specifically the precession constant, the maximum rate change and the bandwidth of the system. One principle in determining an optimum skew angle α or θ is that less skew may prevent the drive sense signal from overpowering the rate signal. As a target, the rate signal should equal the drive sense signal at the rated full scale angular rate to be measured. More generally, the drive sense signal and the maximum rate sense signal should not differ by more than an order of magnitude. That is:

$$0.1 \leq D \cdot \sin(\alpha)/DK \leq 10 \quad \text{Eqn. (12)}$$

The rate signal vibrations spatially lag the driven vibrations because the sense signals are attenuated according to the quality factor Q of the resonant system. The time constant τ of the sense system is hereby defined as the time it takes the amplitude of these vibrations to dampen to 1/e (or approximately 37%) of the initial amplitude. The time constant r is proportional to the inverse of the bandwidth of the gyroscope mechanism. A reasonable sensing skew angle $S_S$ may be taken as the amount of rotation that occurs in one time constant. An equation for an operative sensing skew angle $S_S$ is then:

$$S_S = \gamma M_R/(2\pi B_W) \quad \text{Eqn. (13)}$$

where $S_S$ is the operative sensing skew angle in degrees, γ is the precession constant, $M_R$ is the maximum rate change in degrees per second, and $B_W$ is the bandwidth of the gyroscope output response in Hertz. For example, if the precession constant is 1, the gyroscope output bandwidth is 100 Hz and the maximum expected angular rate is 200 degrees per second, then the target skew angle is 0.32°. This value is independent of the number of nodes and the resonance frequency. The skew angle may be increased to discernable level if the operative sensing skew angle $S_S$ is smaller than the dimensional tolerances of construction.

A desired drive skew angle $S_D$ for the adjustment of torque compatible geometries (e.g. cup and ring gyroscopes) can be calculated based on the same principles as for the sense skew $S_s$ described in connection with Eqn. (13). An additional consideration is to provide enough range in the skew angle θ so as not to require too much drive voltage from the system to affect the torque operation. Excessive signals applied to the drive elements may saturate the system resulting in errors. Generally, having a drive skew angle $S_D$ that is about twice the maximum rated sense skew $S_S$ may provide sufficient over ranging. Accordingly, an equation for an operative drive torquing skew angle $S_D$ is:

$$S_D = 2\gamma M_R/(2\pi B_W); \text{ or}$$

$$S_D = \gamma M_R/(\pi B_W) \quad \text{Eqn. (14)}$$

where $S_D$ is the drive torquing skew angle in degrees, γ is the precession constant, $M_R$ is the maximum rate range in degrees per second, and $B_W$ is the bandwidth of the gyroscope output response in Hertz. For example, if the gyroscope output bandwidth is 100 Hz and the maximum expected angular rate is 200 degrees per second, then the target drive skew angle is 0.64°. As it was for the rate sensing, this value is independent of the number of nodes or the resonance frequency. The drive skew angle $S_D$ may be increased to discernable level if the angle $S_D$ is smaller than construction tolerances can resolve.

A desired drive alignment skew angle $S_A$ for establishing the offset of the drive element axes (e.g. numerical references 638 and 640 of FIG. 10) for cup and ring gyroscopes may be calculated in the same way as the torquing drive skew $S_D$ of Eqn. (14). However, it may be desirable to have the alignment skew angle exceed minimum construction tolerances by a factor of two or three to provide a meaningful over range. Accordingly, an equation for the operative drive skew angle, then, is:

$$S_A = 3D_A \quad \text{Eqn. (15)}$$

where $S_A$ is the drive alignment skew angle in degrees and $D_A$ is the drive alignment tolerance in degrees. For example, if the gyroscope drive alignment tolerance is 0.5°, then the targeted drive alignment skew angle is 1.5°. Therefore, the larger result from Eqn. (13) or Eqn. (14) may be used for the drive alignment skew angle.

The foregoing descriptions present numerous specific details that provide a thorough understanding of various embodiments of the present invention. It will be apparent to one skilled in the art that various embodiments, having been disclosed herein, may be practiced without some or all of these specific details. In other instances, known components have not been described in detail in order to avoid unnecessarily obscuring the present invention. It is to be understood that even though numerous characteristics and advantages of various embodiments are set forth in the foregoing description, together with details of the structure and function of various embodiments, this disclosure is illustrative only. Other embodiments may be constructed that nevertheless employ the principles and spirit of the present invention.

For example, the material used in the cup may be of a non-homogeneous type instead of the homogeneous piezoceramic as described herein. Those skilled in the art recognize that the methods of manufacture of the components that comprise the cup are numerous and are typically chosen based upon the type of materials or orientation that is required for each application. In addition, although the embodiments described herein are directed to vibrating actuator mass sensor systems, it will be appreciated by those skilled in the art that the teachings disclosed herein can be applied to other systems, such as various drive control systems, ultrasonics, and power converters, without departing from the scope and spirit of the present invention, which is defined solely by the claims that follow.

What is claimed is:

1. An inertial sensor for sensing a rate of angular rotation, comprising:

a vibratory resonator comprising an axisymmetric body having a central axis;

means for generating an oscillation pattern on said vibratory resonator, said oscillation pattern having a plurality of diametrically opposed nodes and diametrically opposed antinodes that define a plurality of reference axes;

a plurality of operational element pairs operatively coupled to said axisymmetric body, each of said operational element pairs being centered in diametric opposition to define a plurality of operational element axes, each corresponding to a respective one of said operational element pairs such that a first of said plurality of operational element axes is characterized by a first rotational offset relative to a first of said plurality of reference axes, said first of said operational element axes not being in rotational alignment about said central axis with any of said plurality of reference axes, and such that a second of said plurality operational element axes is characterized by a second rotational offset relative to a second of said plurality of reference axes, said second of said plurality of operational element axes not being in rotational alignment about said central axis with any of said plurality of reference axes, said second rotational offset being of substantially equal magnitude with and in a rotational direction opposite from said first rotational offset.

2. The inertial sensor of claim 1 wherein said plurality of operational element pairs are in physical contact with a surface of said axisymmetric body.

3. The inertial sensor of claim 2 wherein said physical contact comprises a bonding or gluing.

4. The inertial sensor of claim 1 wherein a first of said plurality of operational element pairs and a second of said plurality of operational element pairs are sense elements.

5. The inertial sensor of claim 1 wherein said plurality of reference axes define a substantially uniform angular displacement between adjacent reference axes of said plurality of reference axes and wherein said first rotational offset is less than half of said substantially uniform angular displacement.

6. An inertial sensor for sensing a rate of angular rotation, comprising:
a first vibrating member driven into oscillation along a first drive vector;
a first sense element operatively coupled to said first vibrating member to sense a first response vector; said first response vector having a first drive component and a first rotation rate component, said first sense element being oriented to sense said first drive component and said first rotation rate component of said first response vector, said first drive component being of a first fixed proportion to said first drive vector for resolution of said first drive vector, said first rotation rate component being proportional to said rate of angular rotation;
a second vibrating member driven into oscillation along a second drive vector, said second drive vector being substantially parallel with said first drive vector; and
a second sense element operatively coupled to said second vibrating member to sense a second response vector, said second response vector having a second drive component and a second rotation rate component, said second sense element being oriented to sense said second drive component and said second rotation rate component of said second response vector, said second drive component being of a second fixed proportion to said second drive vector for resolution of said second drive vector, said second rotation rate component being proportional to said rate of angular rotation, said second drive component having a direction substantially opposite to said first drive component.

7. The inertial sensor of claim 6 wherein said first drive vector and said second drive vector act substantially along a common axis.

8. An inertial sensor for sensing a rate of angular rotation, comprising:
a resonant body having a centerline; and
a plurality of drive element pairs for generation of an oscillation pattern on said resonant body, each of said plurality of drive element pairs being centered in diametric opposition about said centerline, said plurality of drive element pairs being non-uniformly distributed about said centerline, said drive element pairs being operable to torque said oscillation pattern about said centerline.

9. A method of measuring a drive oscillation and a rotation rate of a vibrating gyroscope comprising:
providing the vibrating gyroscope comprising
a first sensing element oriented at a first fixed skew angle relative to a first node reference axis to sense a first vibration vector having a first drive oscillation component and a first rotational rate component, and
a second sensing element oriented at a second fixed skew angle relative to a second node reference axis to sense a second vibration vector having a second drive oscillation component and a second rotational rate component, said second drive oscillation component being in a direction substantially opposite said first drive oscillation component;
obtaining a first signal from said first sensing element and a second signal from said second sensing element;
subtracting said second signal from said first signal to determine a rotation rate of said vibrating gyroscope; and
adding said first signal to said second signal to determine the magnitude of a drive oscillation.

10. A method of rotating a drive oscillation pattern on an axisymmetric resonant body comprising:
providing a vibrating gyroscope comprising:
a resonant body axisymmetric about a central axis;
a first drive element pair in diametric opposition about said central axis and configured to drive a first vibration pattern having a first nodal distribution on said resonant body, said first vibration pattern capable of being driven by a first input signal;
a second drive element pair in diametric opposition about said central axis and configured to drive a second vibration pattern having a second nodal distribution on said resonant body, said second vibration pattern capable of being driven by a second input signal, wherein said second nodal distribution is rotationally offset at a fixed angle relative to said first nodal distribution; and
applying said first input signal to said first drive element pair and said second input signal to said second drive element pair to produce a combined vibration pattern having a third nodal distribution of variable orientation.

11. The method of claim 10 further comprising:
inferring an orientation of said third nodal distribution;
adjusting either of said first signal and said second signal to rotate said third nodal distribution.

12. The method of claim 10 further comprising:
determining a gain ratio of said first signal to said second signal;
adjusting said gain ratio to rotate said third nodal distribution.

13. The inertial sensor of claim 6, wherein said first fixed proportion and said second fixed proportion are substantially equal.

14. The method of claim 9 wherein said vibrating gyroscope provided in said step of providing is a tuning fork type gyroscope.

* * * * *